United States Patent [19]
Habba

[11] Patent Number: 6,009,592
[45] Date of Patent: *Jan. 4, 2000

[54] LINEARLY RECIPROCATING WIPER APPARATUS

[76] Inventor: Eitan Habba, 70 Rothschild Street, Bat Yam, 59404, Israel

[*] Notice: This patent is subject to a terminal disclaimer.

[21] Appl. No.: 08/860,322

[22] PCT Filed: Dec. 20, 1995

[86] PCT No.: PCT/US95/16594

§ 371 Date: Jun. 23, 1997

§ 102(e) Date: Jun. 23, 1997

[87] PCT Pub. No.: WO96/19368

PCT Pub. Date: Jun. 27, 1996

[51] Int. Cl.[7] ................................ B60S 1/26; B60S 1/20; B60S 1/18
[52] U.S. Cl. .................... 15/250.29; 15/250.25; 74/31
[58] Field of Search .............. 15/250.29, 250.24, 15/250.25, 250.3, 250.26, 250.31, 250.13; 74/31, 29

[56] References Cited

U.S. PATENT DOCUMENTS

| | | | |
|---|---|---|---|
| 1,561,320 | 11/1925 | Glidric et al. ................. | 15/250.29 |
| 2,984,855 | 5/1961 | Murray ........................... | 15/250.29 |
| 5,068,942 | 12/1991 | Vrettos ........................... | 15/250.24 |
| 5,564,156 | 10/1996 | Habba ............................. | 15/250.25 |

FOREIGN PATENT DOCUMENTS

| | | | |
|---|---|---|---|
| 184461 | 1/1956 | Austria .......................... | 15/250.29 |
| 917730 | 1/1947 | France ........................... | 15/250.24 |
| 880556 | 6/1953 | Germany ....................... | 15/250.29 |
| 947532 | 8/1956 | Germany ....................... | 15/250.29 |
| 2152978 | 4/1973 | Germany ....................... | 15/250.29 |
| 29548 | 2/1984 | Japan ............................. | 15/250.24 |
| 2173995 | 10/1986 | United Kingdom ............ | 15/250.29 |

*Primary Examiner*—Gary K. Graham
*Attorney, Agent, or Firm*—Mark M. Friedman

[57] ABSTRACT

An apparatus for wiping a non-planar window has a wiper and a track arrangement including a first track substantially parallel to at least a portion of the window and a second track substantially parallel to and displaced from the first track. A drive wheel assembly includes at least one motorized drive wheel. The drive wheel assembly alternately engages the first and second tracks and drives in alternate directions along the length of the track arrangement for drawing the wiper across the surface.

26 Claims, 27 Drawing Sheets

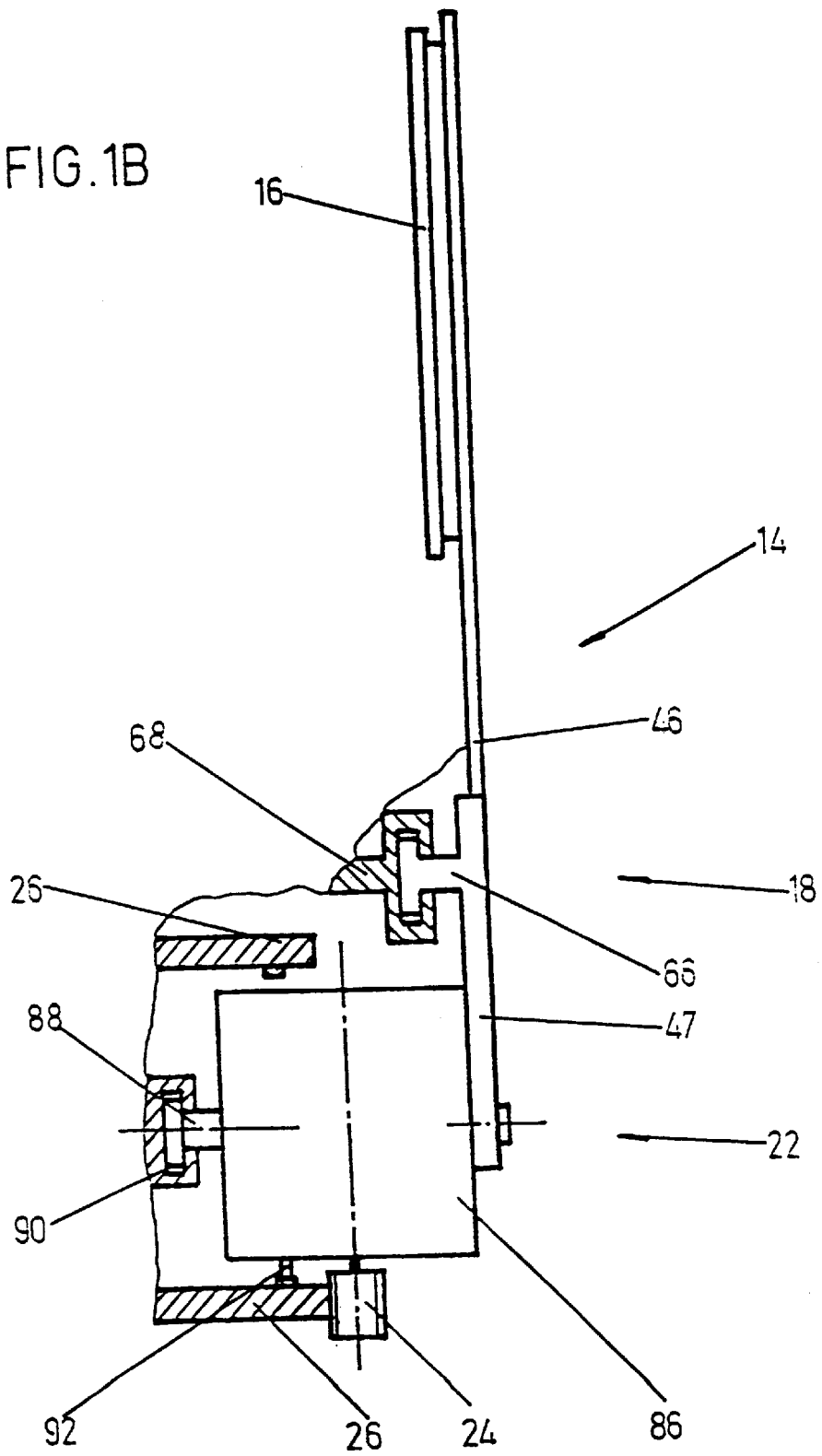

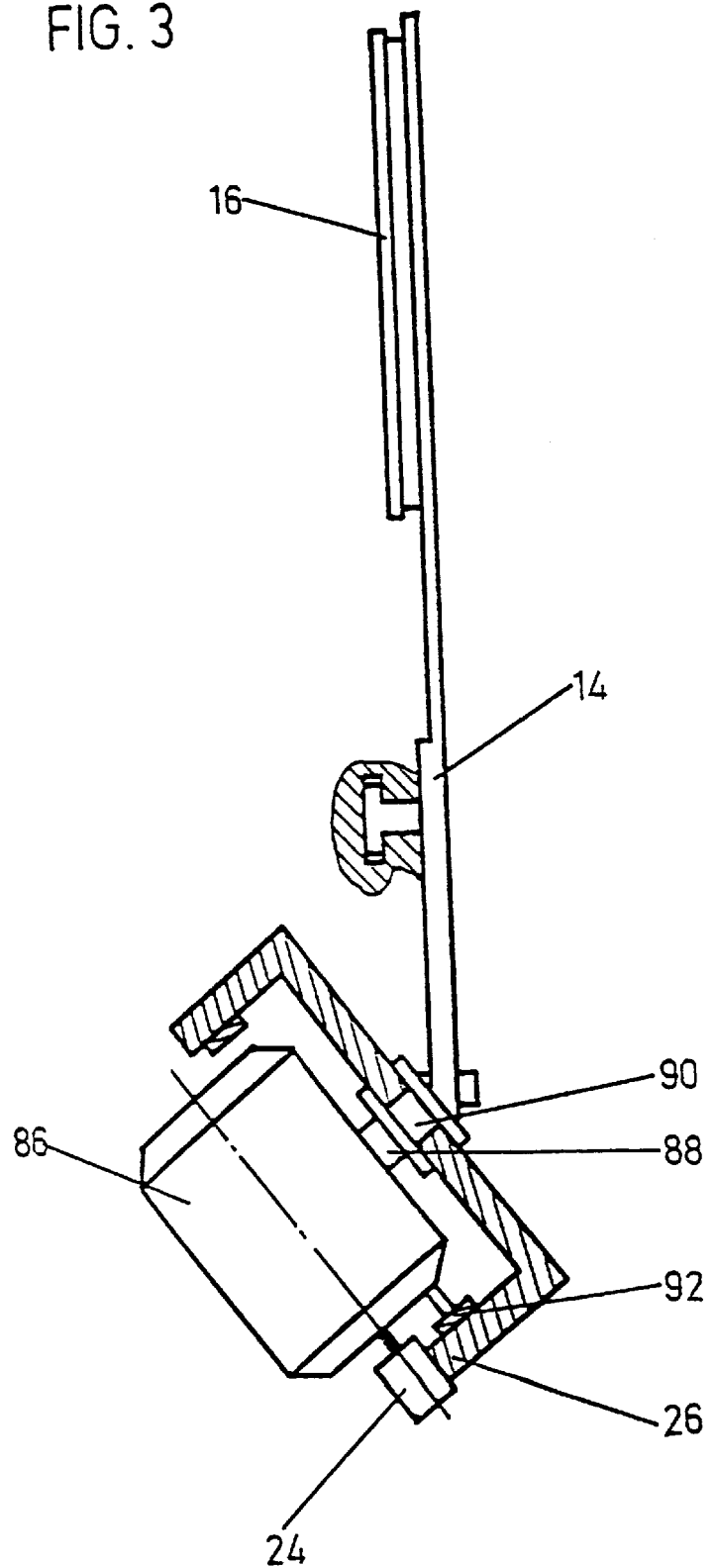

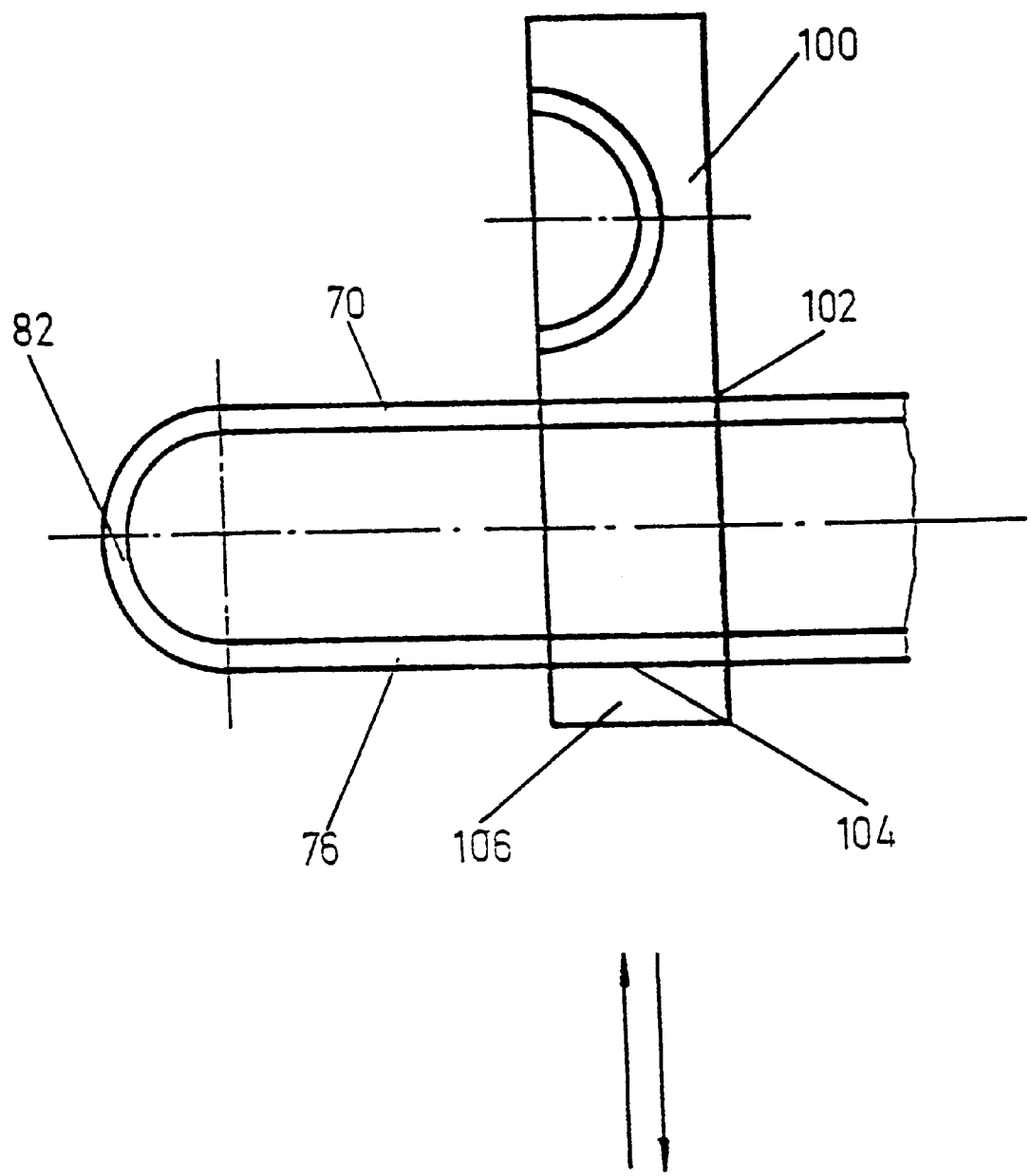

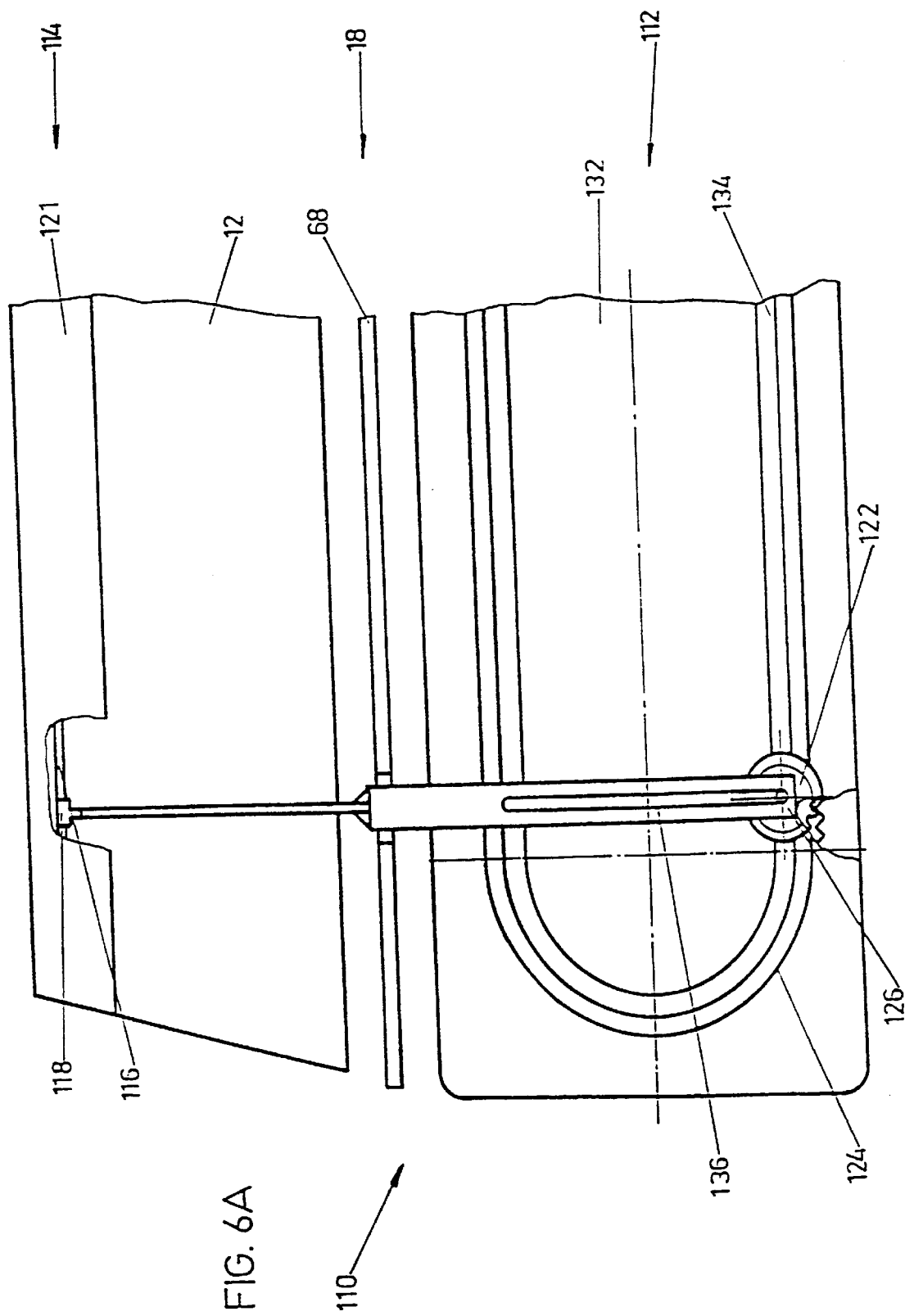

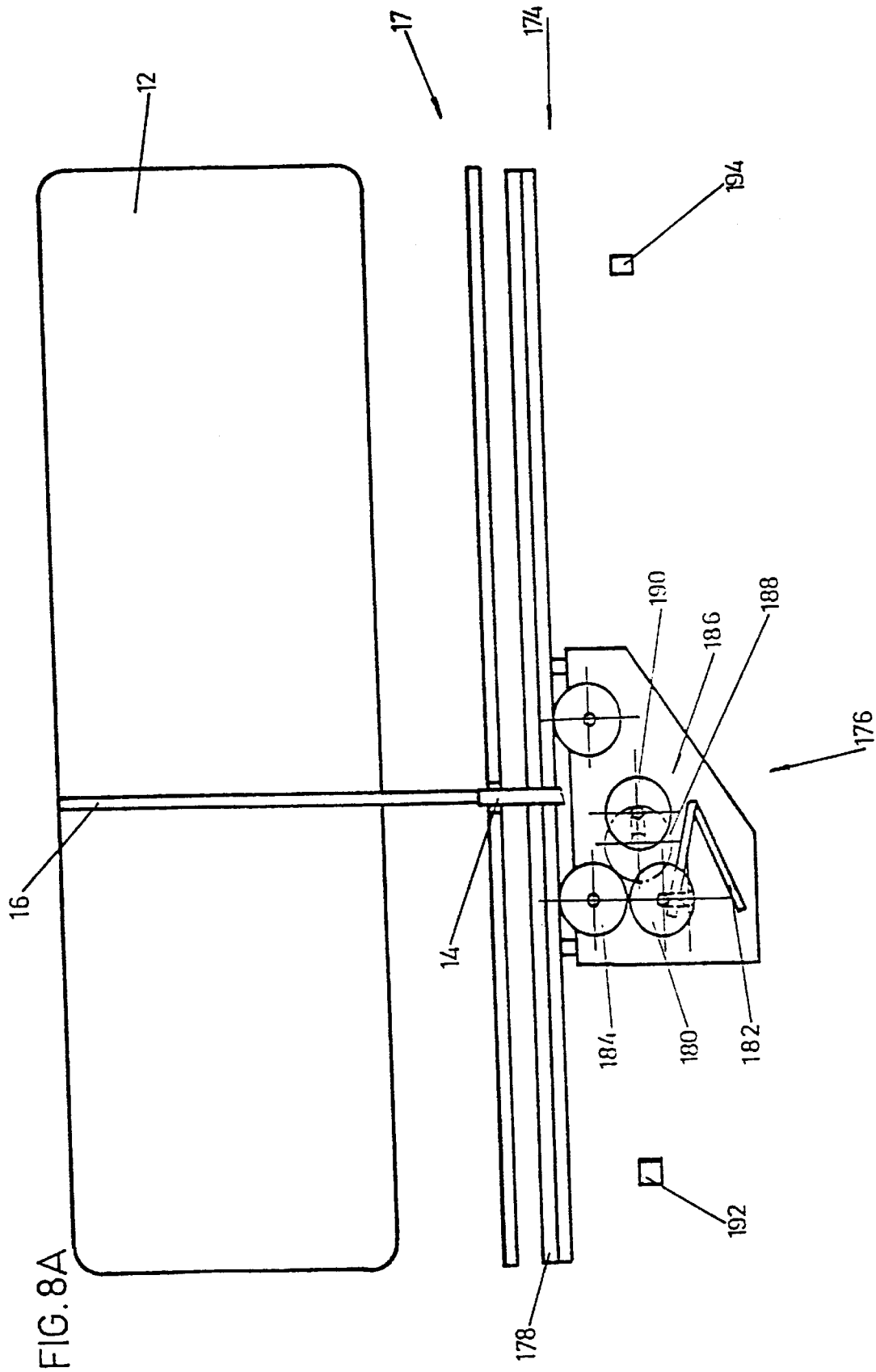

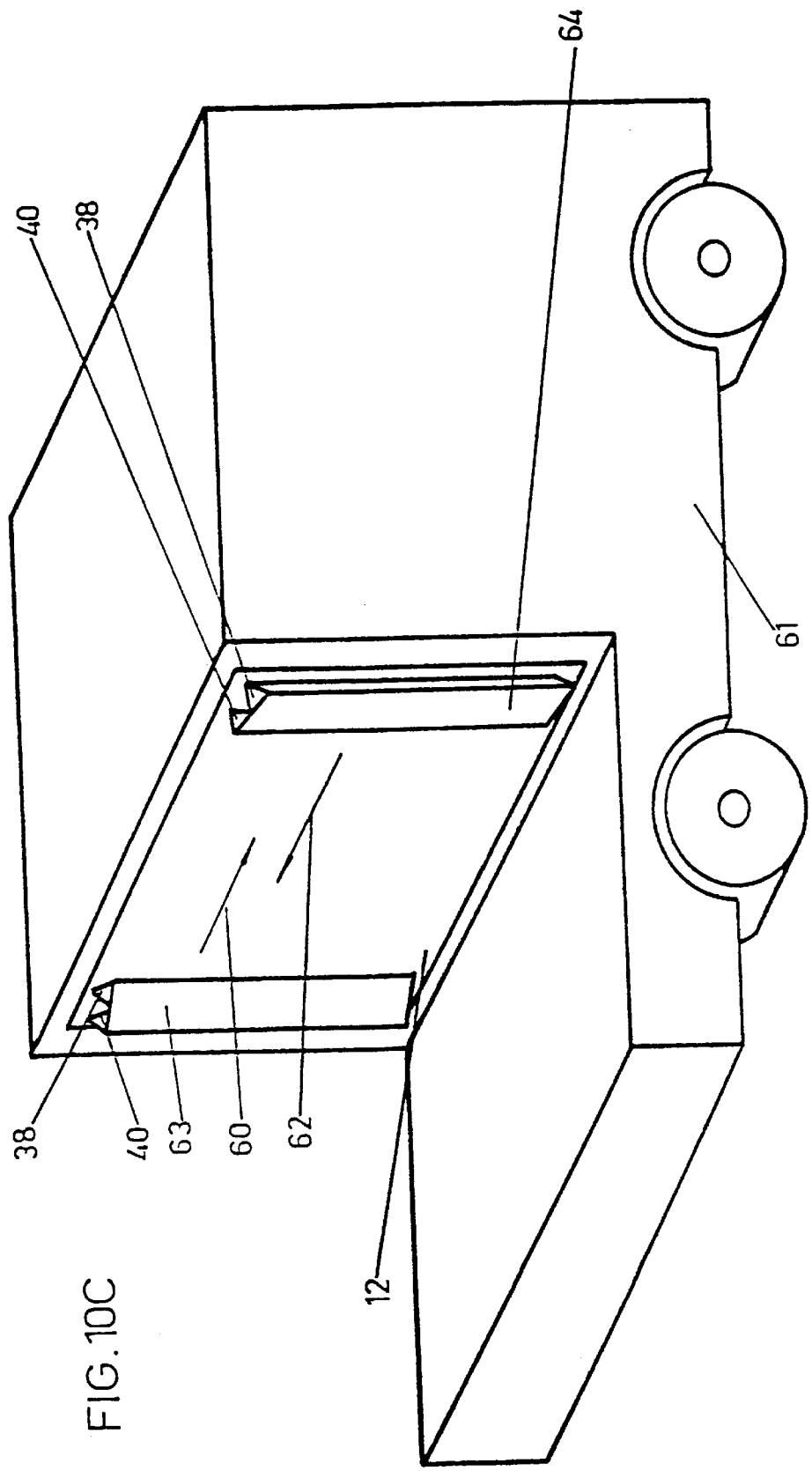

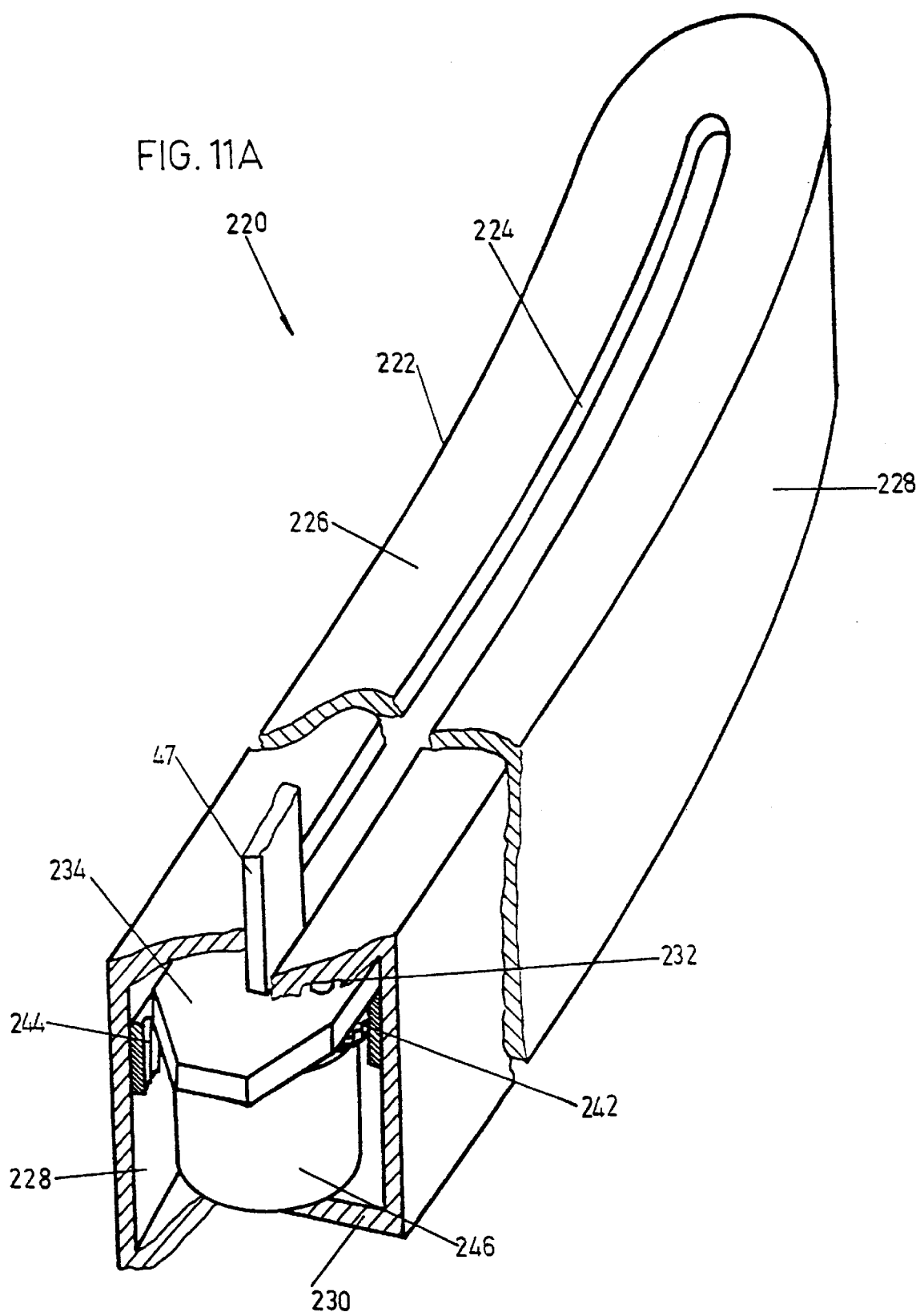

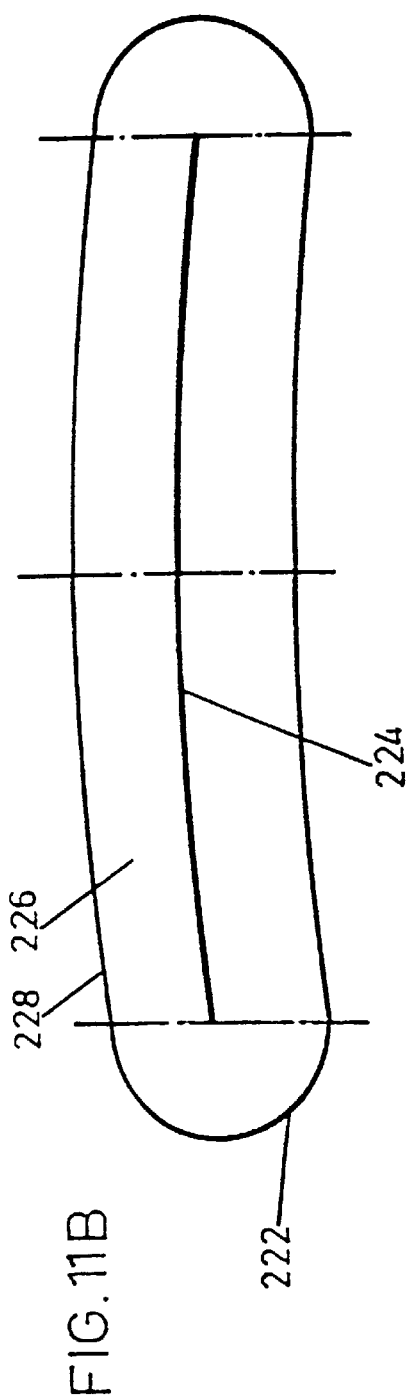
FIG. 11B
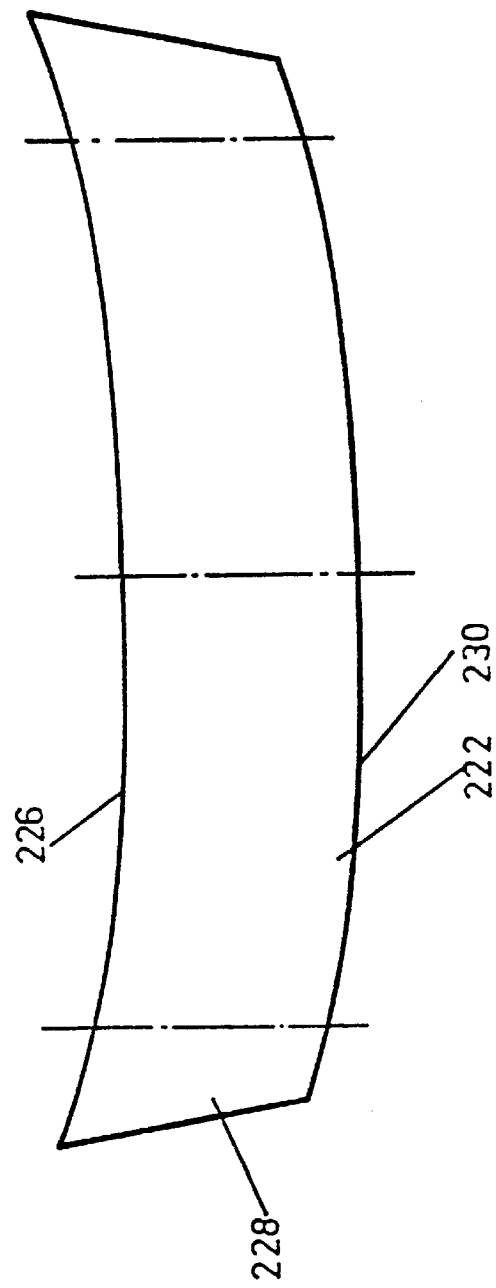

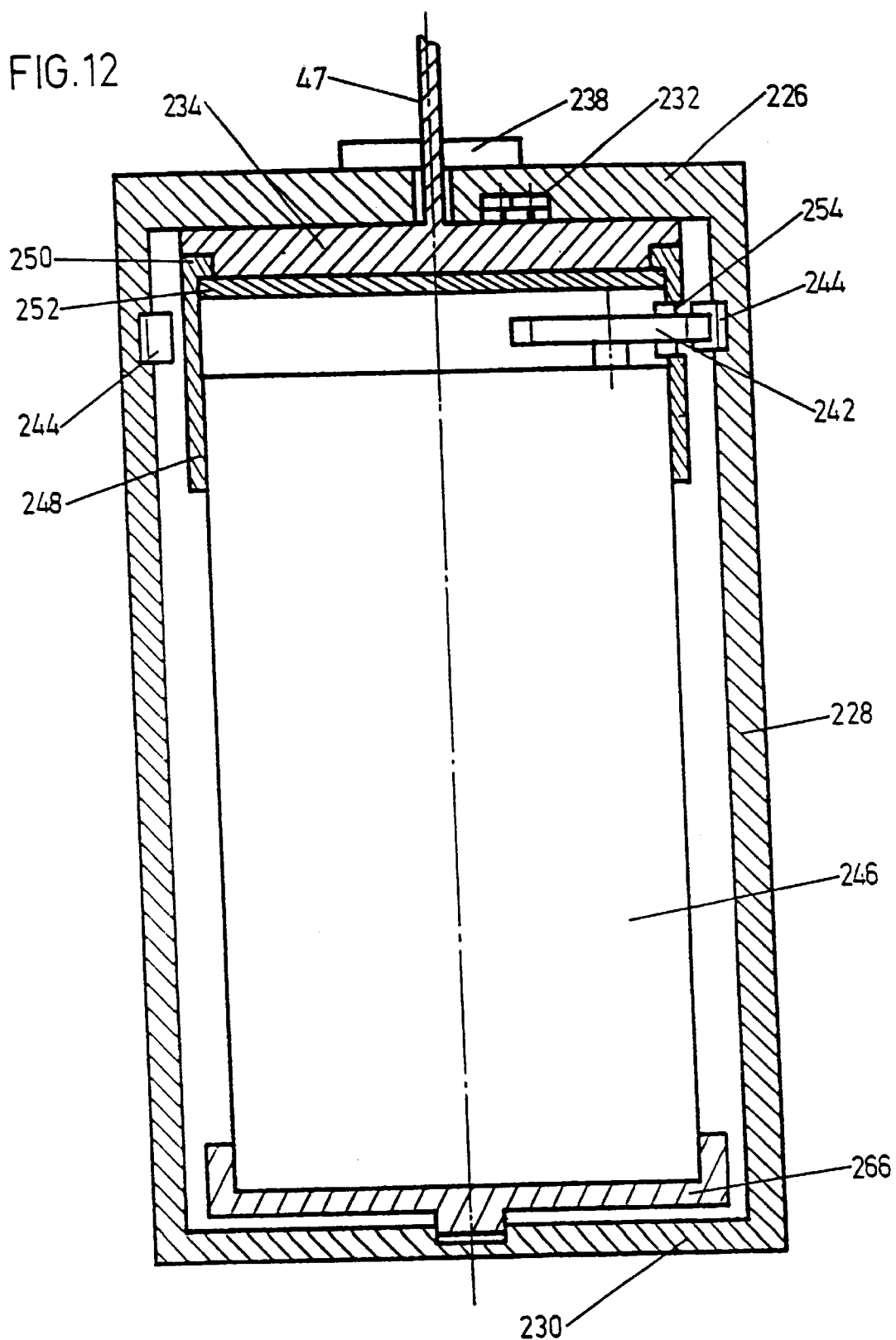

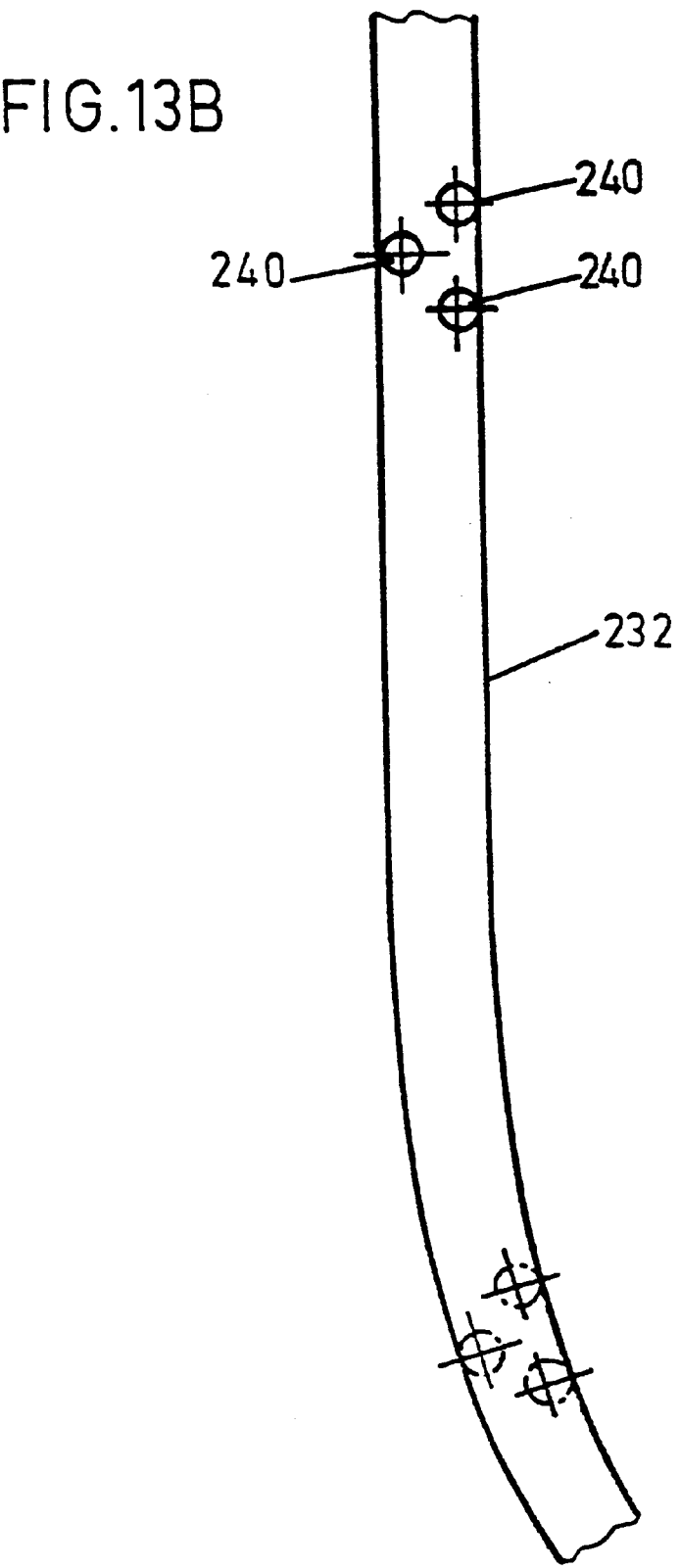

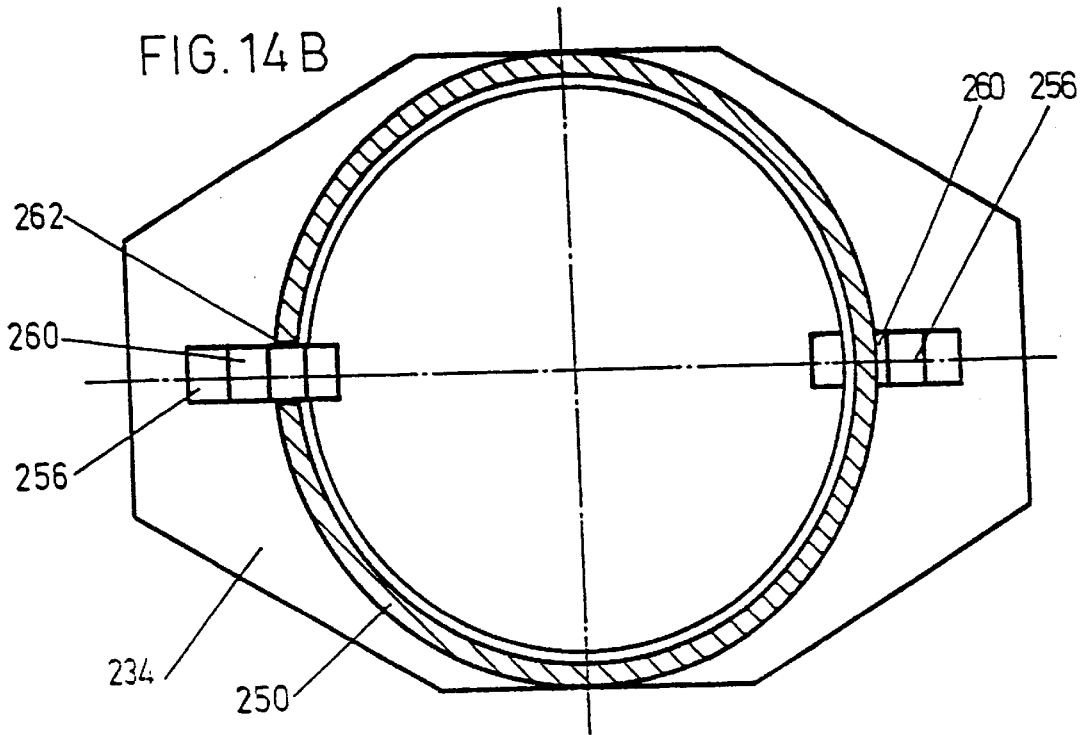
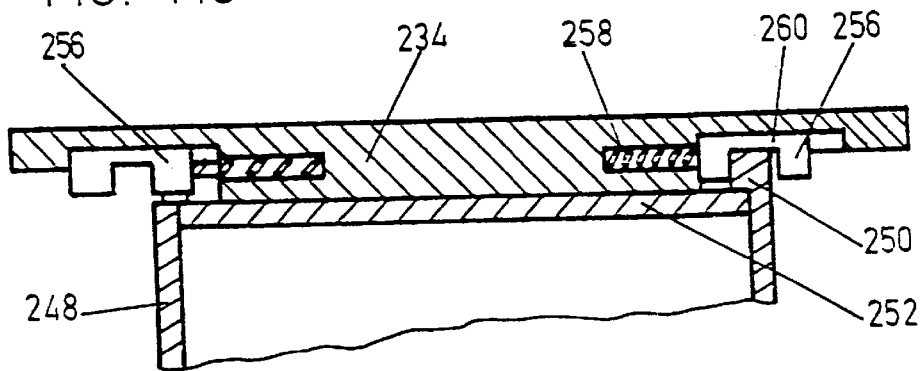

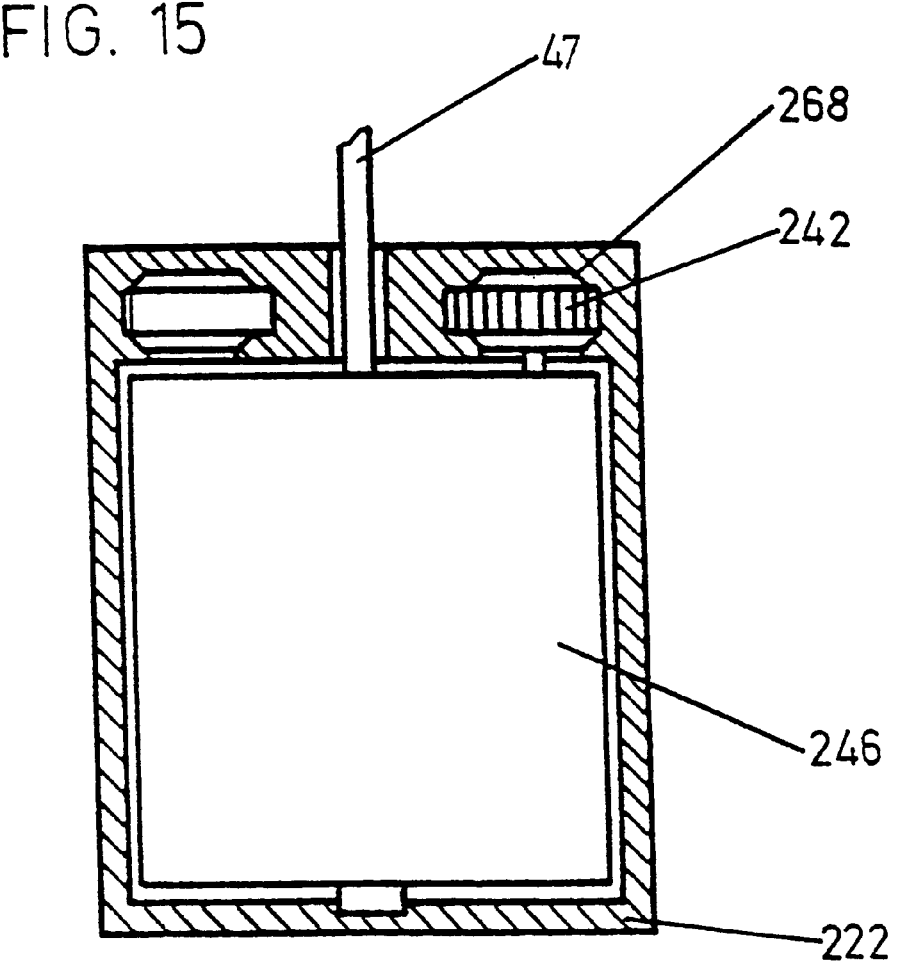

LINEARLY RECIPROCATING WIPER APPARATUS

FIELD AND BACKGROUND OF THE INVENTION

The present invention relates to windscreen wipers in general. In particular, it concerns wipers which move linearly across a surface to be wiped and wipers for preventing drag-back of water during wiping of a surface.

It is known that a wiper travelling linearly across a generally rectangular surface can wipe a much larger proportion of the surface than a wiper with the conventional arcuate motion. However, wipers of this type are not currently in extensive use. This is mainly due to structural problems with the mechanism for producing the required linear reciprocating movement.

U.S. Pat. No. 1,665,570 to Waters, No. 1,748,055 to Brown et al. and more recently No. 5,068,942 to Vrettos describe examples of the predominant mechanism used in conventional linear wipers, hereinbelow referred to as the endless-belt mechanism. The endless-belt mechanism includes an endless belt or chain positioned along one side of a window, and a wiper attached by a rotatable bracket to a point on the endless belt. When the endless belt is driven continuously in one direction by an electric motor, the wiper is pulled to-and-fro across the surface. The endless-belt mechanism has numerous structural problems. There is a tendency for the belt to stretch, resulting in failure of the drive mechanism. Belts made from rubber, synthetic polymers or fabric generally have a very limited lifetime due to wear over the rollers at each end.

Use of a metal chain generally causes unacceptable noise. And when repairs are needed, the entire belt will generally need replacing and refitting.

An alternative mechanism is described in U.S. Pat. No. 1,561,320 to Glidric et al. in which an electric motor mounted on a wiper is used to drive the wiper along a stationary track. A switch is used to reverse the polarity of the power supply when the wiper reaches each end of the window. This design has the advantage that it uses a static track which requires much less maintenance than a moving belt. However, this mechanism puts great strain on the motor by abruptly reversing the polarity of the power supply while the motor is rotating rapidly and has the momentum of the entire wiper assembly tending to maintain its rotation. Since this happens every time the wiper reaches the end of its motion, the motor is likely to deteriorate rapidly requiring frequent maintenance. There is also a delay at each end of the movement due to the time taken by the motor to accelerate to its full speed.

There is therefore a need for an apparatus which has a reliable mechanism for driving a wiper linearly across a window.

SUMMARY OF THE INVENTION

The present invention is of an apparatus for wiping a window.

Hence, there is provided according to the teachings of the present invention, an apparatus for wiping a window, the apparatus comprising: (a) a wiper for wiping the window; (b) a first track substantially parallel to at least a portion of the window; (c) a second track substantially parallel to and displaced from the first track; (d) a first motorized drive wheel for driving the wiper alone the first track in a first direction; and (e) a second motorized drive wheel for driving the wiper along the second track in a second direction, the second direction being opposite to the first direction.

According to a further feature of the present invention the first motorized drive wheel and the second motorized drive wheel are a single motorized drive wheel.

According to a further feature of the present invention the first track has a first end and a second end and the second track has a first end and a second end, the apparatus further comprising: (f) a first curved connecting track connecting between the first end of the first track and the first end of the second track; and (g) a second curved connecting track connecting between the second end of the first track and the second end of the second track, such that the first track, the second track, the first connecting track and the second connecting track form a closed loop track.

According to a further feature of the present invention the single motorized drive wheel has a first surface with teeth for driving along the first track and a second surface with teeth for driving along the first curved connecting track.

According to a further feature of the present invention the first track has a first removable section and the second track has a second removable section, the apparatus further comprising an additional curved connecting track, the additional curved connecting track being substitutable for the first removable section and the second removable section so as to form a shortened closed loop track.

According to a further feature of the present invention there is also provided a motor for driving the first motorized drive wheel and the second motorized drive wheel, the motor being mounted rotatably about an axis perpendicular to a plane containing the first track and the second track.

According to a further feature of the present invention there is also provided: (a) a flexible drive cable attached to the first motorized drive wheel; and (b) a motor, the first motorized drive wheel being driven by the motor through the flexible drive cable.

According to a further feature of the present invention there is also provided a spring-biased mechanism assuming a first position in which the first motorized drive wheel drivingly engages the first track and the second motorized drive wheel is disengaged from the second track, the spring-biased mechanism assuming a second position in which the first motorized drive wheel is disengaged from the first track and the second motorized drive wheel drivingly engages the second track.

According to a further feature of the present invention the first motorized drive wheel and the second motorized drive wheel are a single motorized drive wheel, the apparatus further comprising a mechanism for transferring the single motorized drive wheel between the first track and the second track.

There is also provided according to the teachings of the present invention an apparatus for wiping a window, the apparatus comprising: (a) a wiper for wiping the window; (b) a track substantially parallel to at least a portion of the window; (c) a motor running unidirectionally; (d) a first drive wheel driven by the motor for driving the wiper along the track in a first direction; and (e) a second drive wheel driven by the motor for driving the wiper along the track in a second direction, the second direction being opposite to the first direction.

According to a further feature of the present invention there is also provided a spring-biased mechanism assuming a first position in which the first motorized drive wheel drivingly engages the track and the second motorized drive wheel is disengaged from the track, the spring-biased mechanism assuming a second position in which the first motorized drive wheel is disengaged from the track and the second motorized drive wheel drivingly engages the track.

According to a further feature of the present invention the first motorized drive wheel and the second motorized drive wheel are a single motorized drive wheel.

According to a further feature of the present invention the track has a first end and a second end, the apparatus further comprising (a) a first reversal loop track attached to the first end, the single motorized drive wheel entering the first reversal loop track travelling in the first direction and leaving it travelling in the second direction; and (b) a second reversal loop track attached to the second end, the single motorized drive wheel entering the second reversal loop track travelling in the second direction and leaving it travelling in the first direction.

According to a further feature of the present invention there is also provided a mechanism for reversing the direction of rotation of the single motorized drive wheel.

There is also provided according to the teachings of the present invention a wiper comprising: (a) a first blade for wiping a window in a first travelling direction of the wiper; (b) a second blade for wiping the window in a second travelling direction of the wiper, the second travelling direction being substantially opposite to the first travelling direction; and (c) a mechanism for alternately causing one of the first and second blades to contact the window such that the first blade contacts the window in the first travelling direction and the second blade contacts the window in the second travelling direction.

According to a further feature of the present invention the second blade is substantially parallel to the first blade.

According to a further feature of the present invention the first blade and the second blade are included in a single blade assembly, the wiper further comprising a wiper arm, the blade assembly being hingingly attached to the wiper arm.

There is also provided, according to the teachings of the present invention, an apparatus for wiping a non-planar window along a preferred wiping path defined on the surface of the non-planar window, the apparatus comprising: (a) a wiper for wiping the window; (b) a first track substantially parallel to the preferred wiping path; (c) a second track substantially parallel to and displaced from the first track; and (d) a motorized drive wheel associated with the wiper, the motorized drive wheel travelling alternately along the first track in a first direction and along the second track in a second direction, the second direction being opposite to the first direction, so as to cause the wiper to reciprocate alone the preferred wiping path.

BRIEF DESCRIPTION OF THE DRAWINGS

The invention is herein described, by way of example only, with reference to the accompanying drawings, wherein:

FIG. 1B is a schematic side view of the apparatus of FIG. 1A;

FIG. 3 is a schematic side view of an alternative configuration of the apparatus of FIG. 1A;

FIG. 4 is a schematic view of a track with a removably insertable section for use with the apparatus of FIG. 1A;

FIG. 6A is a schematic front view of a second embodiment of an apparatus for wiping a window, the apparatus having a secondary support mechanism for supporting a wiper and a drive mechanism, the apparatus being constructed and operative according to the teachings of the present invention;

FIG. 8A is a schematic front view of a fourth embodiment of an apparatus for wiping a window, the apparatus being constructed and operative according to the teachings of the present invention;

FIG. 10C is a schematic view of a vehicle using the wiper of FIG. 10B;

FIG. 11A is a partially cut-away perspective view of an additional embodiment of an apparatus for wiping a window, the apparatus being formed as a box-like assembly, the apparatus being constructed and operative according to the teachings of the present invention;

FIGS. 11B and 11C are schematic top and front views of the box-like assembly of FIG. 11A:

FIG. 12 is a cross-sectional view through the box-like assembly of FIG. 11A;

FIG. 13B is a schematic plan view illustrating the operation of the alignment mechanism of FIG. 13A;

FIG. 14B is a cross-sectional top view of the locking mechanism of FIG. 14A;

FIG. 14C is a cross-sectional side view of the locking mechanism of FIG. 14A; and FIG. 15 is a cross-sectional view through a variant of the box-like assembly of FIG. 11A.

DESCRIPTION OF THE PREFERRED EMBODIMENTS

Figure 1A:
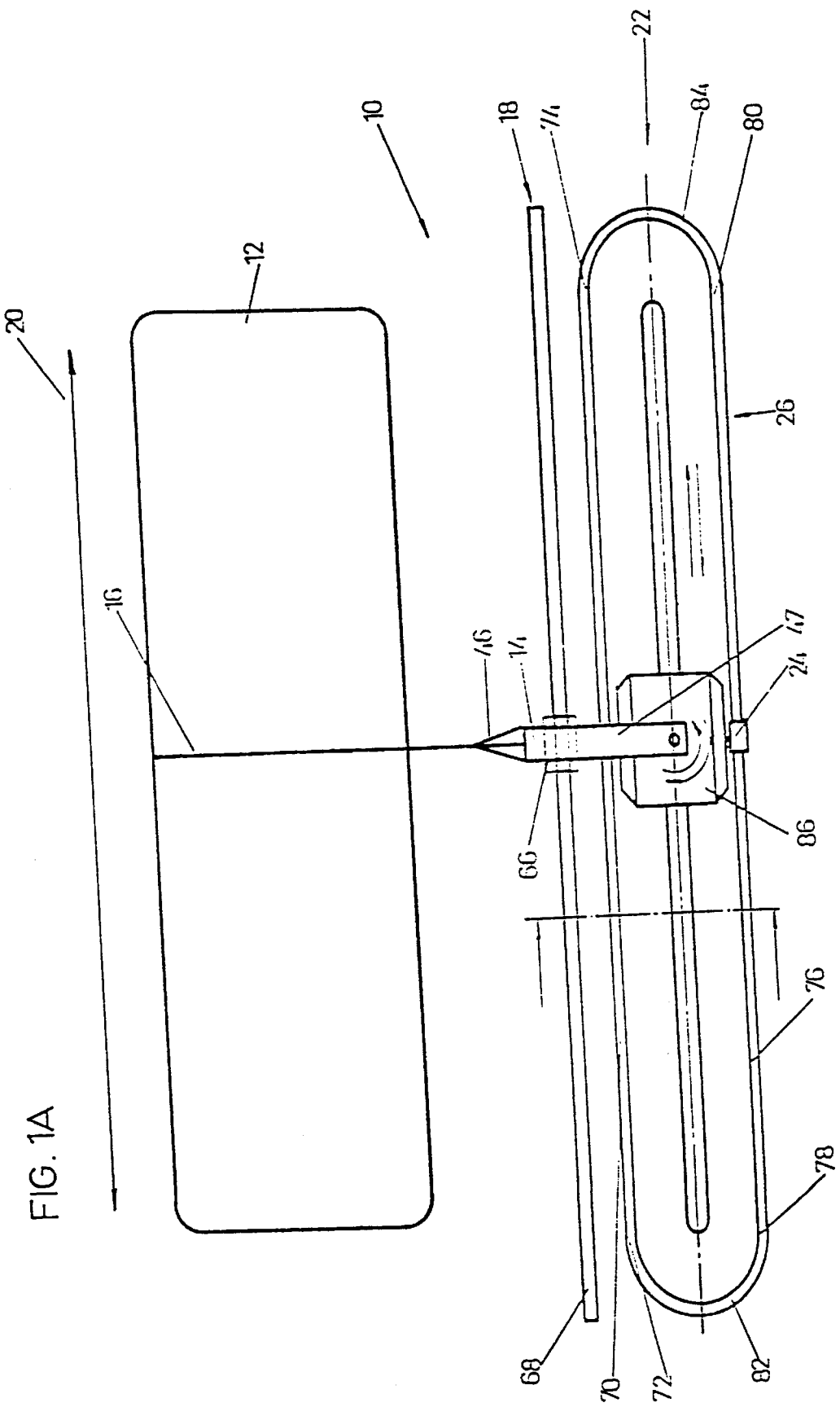
FIG. 1A is a schematic front view of a first embodiment of an apparatus for wiping a window, the apparatus being constructed and operative according to the teachings of the present invention.

The present invention is of an apparatus for wiping a window.

The principles and operation of an apparatus according to the present invention may be better understood with reference to the drawings and the accompanying description.

It should be understood that, while the invention will herein be described in connection with a window, it can equally be applied to any surface for which an automated wiping apparatus is desirable, such as a headlamp cover, the visor of a motorcycle helmet or external surfaces of a building. Furthermore, it is not limited to rectangular surfaces or to planar surfaces. The wiping motion can be horizontal, vertical or along any other preferred wiping-path. It should further be appreciated that features of the present invention described in the context of one embodiment are equally applicable to other embodiments hereinbelow described.

Referring now to the drawings, FIGS. 1 to 5 illustrate a first embodiment of the present invention. FIGS. 1A and 1B show an apparatus, generally designated 10. for wiping a window 12. Generally speaking, apparatus 10 has a wiper 14 with a blade 16 which contacts window 12 along a major part of one of its dimensions, herein called its height. Apparatus 10 includes a support mechanism 18 for supporting wiper 14 slidably along a substantially linear path 20. Path 20 is parallel to a second dimension of window 12, herein called its width, substantially perpendicular to its height. Apparatus 10 also includes a drive mechanism 22 for driving wiper 14 reciprocally along path 20. Drive mechanism 22 includes a motorized drive wheel 24 which runs along a track, generally designated 26.

The motion of wiper 14 along path 20 is described as linear, distinguishing this motion from the arcuate motion of most conventional wipers. It should be noted that the word "linear" is herein used to refer to the path of shortest distance between two points on the surface being wiped, and does not necessarily correspond to a straight path in three-dimensional space. When apparatus 10 is used for a curved surface, such as a wrap-around-type windscreen, path 20 matches the curvature of the surface so that blade 16 is kept in continuous contact with the surface as wiper 14 moves.

When apparatus 10 is used for a motor vehicle, support mechanism 18 and driving mechanism 22 are preferably concealed under the body panels below the windscreen, allowing apparatus 10 to be substituted for a conventional wiper system with minimal adaptation of the vehicle design. Apparatus 10 may be mounted attached in a specially designed part of a vehicle at the time of manufacture, or may be constructed as a universal system adapted to fit as a replacement in place of a conventional wiper system. Apparatus 10 is attached to the vehicle by any suitable means.

The features of wiper 14, support mechanism 18 and driving mechanism 22 will now be described in more detail. Relating first to the features of wiper 14, wiper 14 has a wiper arm 46 for supporting blade 16, and a base 47 for transferring the motion of drive mechanism 22 to wiper arm 46.

Preferably, wiper 14 is of a design for reducing "drag-back" of water across window 12, as will be described below with reference to FIGS. 10A. 10B and 10C. Alternatively, apparatus 10 may use any conventional type of wiper arm 46, integrally formed with a blade, or receiving a blade as a separate replaceable component. Since apparatus 10 produces substantially linear movement across window 12, blade 16 generally encounters a relatively constant curvature of window 12. Wiper 14 therefore does not generally require the articulated system used in conventional wipers to maintain contact with window 12 during their arcuate motion. This allows wiper arm 46 to be made more compact than a conventional wiper arm. Wiper arm 46 may itself be a separate replaceable component attachable to base 47. Wiper 14 is preferably sufficiently rigid to support itself, allowing both support mechanism 18 and driving mechanism 22 to be positioned along one side of window 12.

It is a further feature of certain embodiments of the present invention that provisions are made for parking wiper 14 in such a way as to protect wiper 14, to preserve optimal visibility through window 12 and to be more aesthetically acceptable than conventional designs. A parking position is provided at or beyond one end of the operational range of movement of wiper 14. An example of a mechanism for parking beyond the normal range of movement of wiper 14 will be described below. In some embodiments, the parking position is at the border of window 12 so that wiper 14 lies flush with the body panel at the edge of window 12. In this case, a magnetic, electromagnetic or mechanical catch may be provided for retaining wiper 14 in its parking position while not in use. In this case, wiper 14 appears as an integral part of the frame of window 12. In other embodiments, a protective shield is provided on the surface bordering window 12. wiper 14 being withdrawn under the protective shield when parked. In this case,. wiper 14 is protected when not in use, and is hidden from view without in any way obstructing visibility through window 12.

Relating now to features of support mechanism 18, support mechanism 18 includes a sliding bracket 66 mounted on a rail 68 parallel to path 20. Wiper 14 is attached to sliding bracket 66 so that wiper 14 is supported while being able to move freely alone path 20. In some embodiments, sliding bracket 66 is constructed so as to keep wiper 14 at a constant angle to the axes of window 12. Support mechanism 18 may take many alternative forms, and in some embodiments is included within drive mechanism 22.

Relating now to features of drive mechanism 22, drive mechanism 22 has a motorized drive wheel 24 which runs along a track, generally designated 26. Track 26 includes an upper track 70 having a first end 72 and a second end 74, track 70 being parallel to the width of window 12. A lower track 76, having a first end 78 and a second end 80, is parallel to and displaced from upper track 70. A first curved connecting track 82 connects between first end 72 and first end 78, and a second curved connecting track 84 connects between second end 74 and second end 80, thereby forming single closed loop track 26. Curved connecting tracks 82 and 84 are preferably semi-circular, typically having a diameter of about 40–60 mm.

Although tracks 70 and 76 are referred to as upper and lower, these names are given only for convenience. In fact, tracks 70 and 76 may be vertical, alone the side of window 12, and they may be positioned in any other orientation desired. Furthermore, tracks 70 and 76 may lie in a plane parallel to window 12, perpendicular thereto, or at any other inclination suited to the geometry of the surfaces to which apparatus 10 is to be attached.

The structural arrangement of driving mechanism 22 is best seen in FIG. 1B. Motorized drive wheel 24 travels along track 26 powered by an electric motor 86. In order to allow motorized drive wheel 24 to travel along track 24, both motorized drive wheel 24 and motor 86 are mounted rotatably on an axle 88 which is itself mounted on a sliding carriage 90. Axle 88 is perpendicular to a plane defined by the surface of upper track 70 and the surface of lower track 76. Sliding carriage 90 is free to move parallel to path 20. Power is supplied to electric motor 86 through a single sliding contact 92, the second connection being provided through axle 88.

Traction between motorized drive wheel 24 and track 26 is achieved through friction. The materials used and the contact force must be sufficient to maintain sufficient friction to drive wiper 14 even when wet. Alternatively, drive mechanism 22 may be enclosed in a waterproof casing, with wiper 14 extending from between two weatherproof strips.

In an alternative embodiment, motorized drive wheel 24 is a gear wheel and track 26 is a matching rack. Use of a gear wheel is advantageous since it is not effected by moisture. Any type of gear wheel and matching rack may be used, including spur gears, helical gears and sprockets. Most types of gears have a parallel-axes form suitable for meshing with a straight rack and a significantly different bevel gear form for meshing in intersecting-axes applications. Care must therefore be taken to design motorized drive wheel 24 and track 26 to allow continuous meshing around track 26, both on straight tracks 70 and 76, and curved connecting tracks 82 and 84.

Figure 2A:
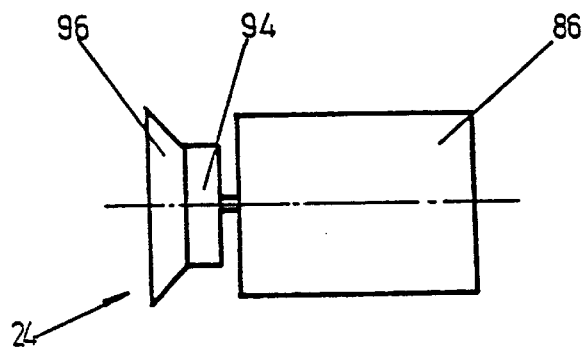
FIG. 2A is a schematic view of a geared motorized drive wheel for use with the apparatus of FIG. 1A.
Figure 2B:
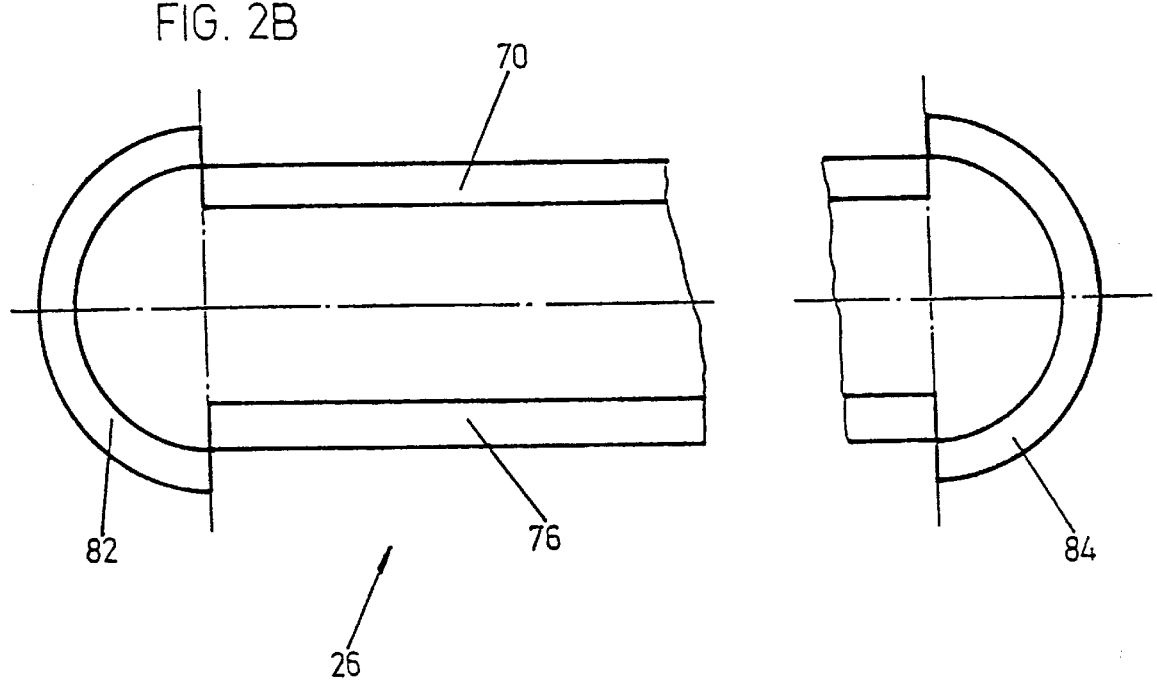
FIG. 2B is a schematic view of a track for use with the geared motorized drive wheel of FIG. 2A.

FIG. 2A and 2B illustrate one possible form of motorized drive wheel 24 and corresponding track 26 for a geared embodiment. FIG. 2A shows motorized drive wheel 24 attached to motor 86. Motorized drive wheel 24 has a first surface 94 with the form of a parallel-axes gear, and a second surface 96 with the form of an intersecting-axes bevel gear. FIG. 2B shows the corresponding design of track 26, in which tracks 70 and 76 are linear racks matching surface 94, and curved connecting tracks 82 and 84 have the form of bevel gears matching surface 96. The diameter of curved connecting tracks 82 and 84 is slightly larger (or alternatively slightly smaller) than the separation of tracks 70 and 76 so that they selectively cooperate with the corresponding surface of motorized drive wheel 24. The number of teeth on surface 94 must be matched to the number on surface 96, as must the teeth of tracks 70 and 76 with those of curved connecting tracks 82 and 84 so that a smooth transition between straight and curved sections is ensured. Track 26 thus acts as a single continuous track for the compound-form of motorized drive wheel 24.

Although this embodiment has been illustrated with motorized drive wheel 24 driving against track 26 on the side nearest to wiper 14, drive mechanism 22 may be restructured so that motorized drive wheel 24 drives against track 26 on the side furthest from wiper 14, as shown in FIG. 3. This has the advantage that the contact surfaces of motorized drive wheel 24 and loop 26 are protected from penetration of dirt and other foreign matter. Apparatus 10 may equally be constructed with motorized drive wheel 24 driving against the internal or external surface of loop 26. In fact, either of the latter possibilities has the advantage that, when a geared drive is used, the shape of the teeth on curved connecting tracks 82, 84 is simplified. An apparatus employing a gear wheel driving against the internal surface of a track will be described below with reference to FIG. 6.

As mentioned earlier, it is a particular feature of the present invention that it may be used to wipe windscreens of a wrap-around type, or other curved surfaces along any preferred wiping path. Obviously, in order to drive a wiper along a wiping path on a curved surface, a corresponding curvature of tracks 70 and 76 is required. Typically, this curvature may be described in terms of two components relative to the orientation of the tracks. A first component of curvature of the tracks is such that a plane containing the tangents to tracks 70 and 76 at a first point is non-parallel to a plane containing the tangents to these tracks at a second point. This curvature is inherent to the present invention whenever it is applied to a wrap-around-type windscreen unless tracks 70 and 76 lie in a plane perpendicular to the surface to be wiped. A second component of curvature of the tracks is such that a line of shortest distance between a first point on track 70 and track 76 is non-parallel to a line of shortest distance between a second point on track 70 and track 76. This curvature is inherent to the present invention when it is applied to a wrap-around-type windscreen whenever the shortest line connecting tracks 70 and 76 is not parallel to the surface to be wiped.

FIG. 4 illustrates a further optional feature of this embodiment in which an additional curved connecting track 100 is insertable at an intermediate position along tracks 70 and 76. To allow the insertion of additional curved connecting track 100, a first removable bridge 102 is included in track 70, and a second removable bridge 104 is included in track 76. Preferably, additional curved connecting track 100 and first and second removable bridges 102 and 104 are all mounted on a sliding trolley 106 so that a single sliding motion affects the insertion or its reversal. Sliding trolley 106 may be moved by an electric servomotor (not shown) or any other convenient actuating mechanism. Alternatively, additional curved connecting track 100 may be fixed between tracks 70 and 76, the "insertion" being achieved by a rail-switching mechanism similar to points of a railway track. In the latter case, drive mechanism 22 must be restructured so that its moving parts lie above the plane of track 26.

According to this feature, apparatus 10 is switchable between a first mode of operation in which wiper 14 reciprocates along entire track 26, and a second mode, when additional curved connecting track 100 is inserted, in which wiper 14 reciprocates along a shortened track formed by first curved connecting track 82, additional curved connecting track 100 and the parts of tracks 70 and 76 lying between them. Typically, this feature is used in vehicles to allow switching between wiping of the entire windscreen and selective wiping of the area in front of the driver. Selective wiping is of particular importance in severe weather conditions when rapid wiping is required. Wiper 14, when reciprocating along a reduced path length, wipes the selected area more frequently, thereby maintaining maximum visibility for the driver.

An identical mechanism may be provided to replace first curved connecting track 82 with linear extensions to tracks 70 and 76. This enables wiper 14 to be moved to a parking position beyond its normal operational range of movement, as was mentioned above.

In one embodiment, apparatus 10 is provided with two drive mechanisms 22 located on opposite sides of window 12. In this case, drive mechanisms 22 must be precisely synchronized so that they remain exactly in phase during extended use.

Apparatus 10 is controlled by a simple control system (not shown) similar to that of a conventional wiper system. In its simplest form, all that is required is a switch or rheostat controlling the voltage applied to electric motor 86. The control system preferably also includes a mechanism for ensuring that wiper 14 continues to move when deactivated until reaching its intended parking position. If the configuration of track 26 is to be altered while apparatus 10 is operating, a more sophisticated control system is required. The control system must prevent trolley 106 being moved while motorized drive wheel 24 is on removable bridges 102, 104 or on a part of track 26 not to be included in the new configuration. This control system may include a number of microswitches actuated by the motion of wiper 14, located so as to indicate the position of wiper 14.

Figure 5A:
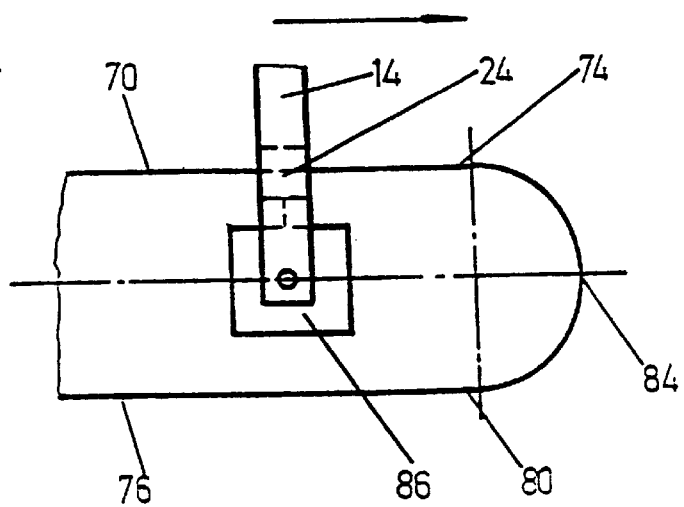
FIG. 5A is a schematic view of the apparatus of FIG. 1A in a first position.
Figure 5B:
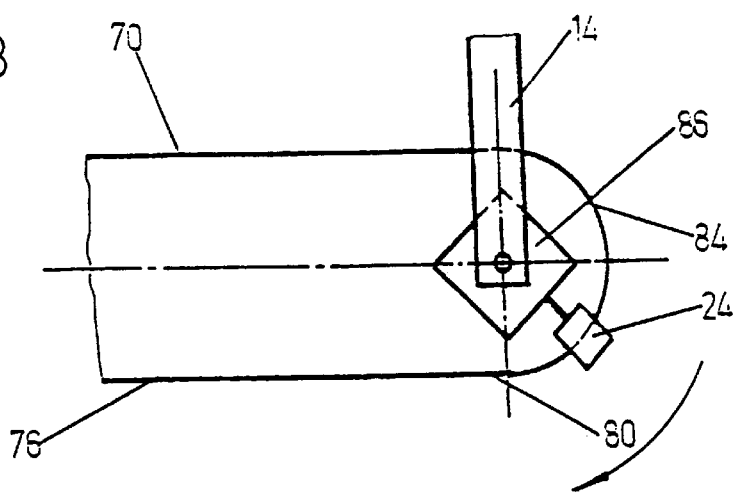
FIG. 5B is a schematic view of the apparatus of FIG. 1A in a second position.
Figure 5C:
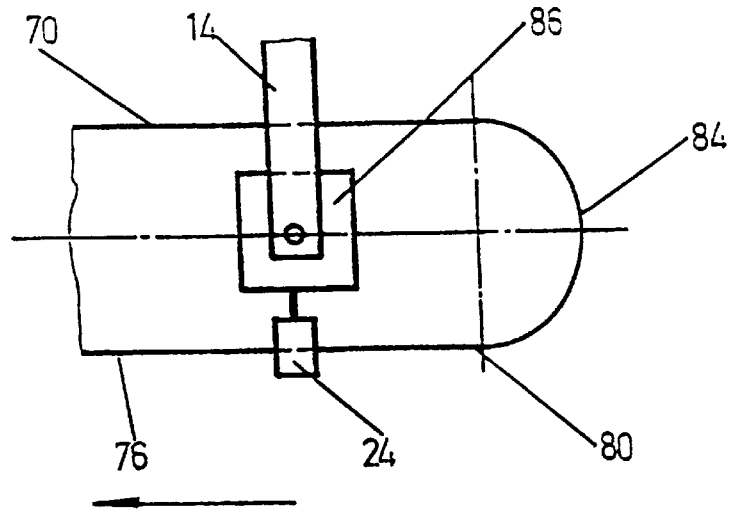
FIG. 5C is a schematic view of the apparatus of FIG. 1A in a third position.

The operation of apparatus 10 will now be described with reference to FIGS. 5A, 5B and SC. FIG. SA shows motorized drive wheel 24 driving wiper 14 along upper track 70 in first direction 60 so that blade 16 is drawn across window 12. As motorized drive wheel 24 passes second end 74, it starts to drive around second curved connecting track 84, thereby turning motor 86 on axle 88 as shown in FIG. 5B. To prevent carriage 90 from overshooting its end position and derailing motorized drive wheel 24, a stop is provided to limit the movement of carriage 90. Alternatively, motorized drive wheel 24 may have an internal flange cooperating with the inner edge of track 26. When motorized drive wheel 24 reaches second end 80, it continues along lower track 76 in second direction 62, as shown in FIG. 5C, driving carriage 90 and thereby wiper 14 back across window 12. A flange-edge on the outer side of motorized drive wheel 24 prevents motor 86 from over-rotating around axle 88. Alternatively. when a gear wheel is used, the form of the teeth on tracks 70 and 76 ensures linear progression along those tracks.

FIGS. 6A, 6B, 6C, 6D and 6E show a second embodiment of the present invention, in which an apparatus, generally designated 110, is provided for wiping window 12. Apparatus 110 is similar to apparatus 10, equivalent elements being designated similarly. In this embodiment, drive mechanism 22 is replaced by a drive mechanism 112. Wiper 14 is additionally supported by a secondary support mechanism 114 along the side of window 12 opposite drive mechanism 112.

Figure 6B:
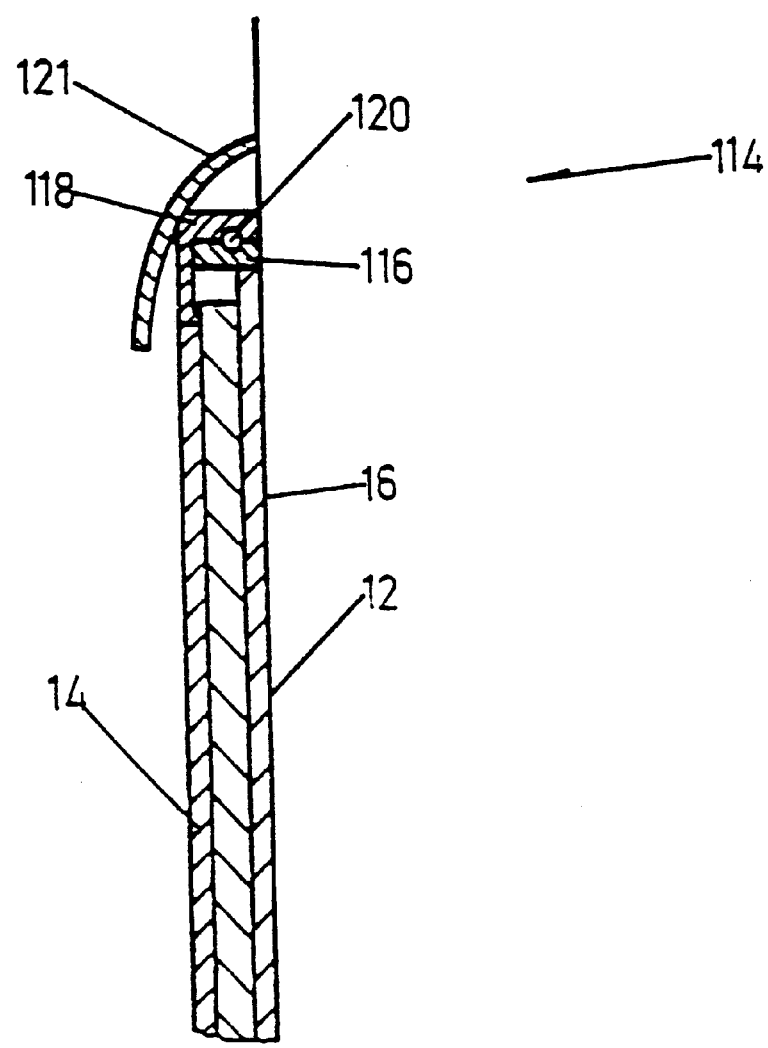
FIG. 6B is a schematic side view of the secondary support mechanism of the apparatus of FIG. 6A.
Figure 6C:
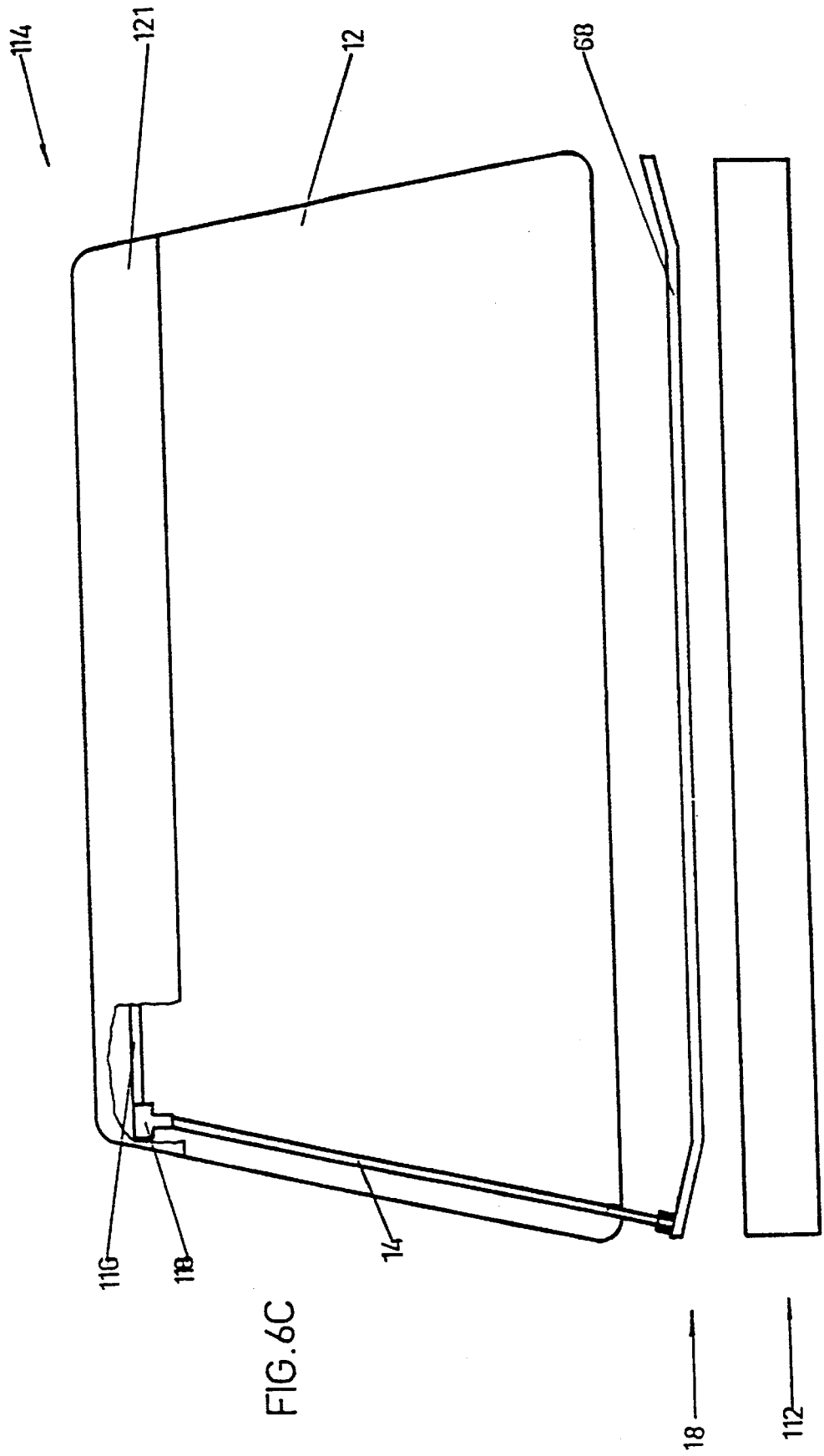
FIG. 6C is a schematic front view of the apparatus of FIG. 6A adapted for wiping a trapezoid window.

Secondary support mechanism 114, as shown in FIGS. 6A, 6B and 6C, includes a projecting ridge 116 along the edge of window 12. An end bracket 118, attached to the end of wiper 14, hooks over projecting ridge 116. End bracket 118 is provided with a slider-mechanism, represented by ball-bearing 120, enabling bracket 118 to slide freely along projecting ridge 116. Secondary support mechanism 114 is protected from damage and hidden from view by a cover 121.

In this embodiment, since wiper 14 is supported at both ends, it is possible to use a narrow wiper. Use of a narrow wiper design is advantageous, interfering less with visibility through window 12 than a conventional wiper. In the case of vehicle windscreen wipers, a narrow wiper design has an additional advantage of reducing air resistance. Drive mechanism 114 may be hidden under the body panels of a vehicle with narrow slits provided for driving wiper 14, so that aerodynamic shaping of the vehicle's body panels is not interrupted. Wiper 14 may also be of a design for reducing drag-back of water across window 12, similar to that described with reference to FIGS. 10A, 10B and 10C below, with the mechanism of FIG. 10B used at both ends of wiper 14.

In some cases, wiper 14 is somewhat flexible. This is particularly important when window 12 is wider along one side than the other, as shown in FIGS. 6A and 6C. The flexibility of wiper 14 allows drive mechanism 22 to continue to move blade 16 across the longer side of window 12 after end bracket 118 has reached the edge of the shorter side. Where the difference in length between the two sides of window 12 is small, the longitudinal stress applied to wiper remains minimal. Where the difference is larger, both ends of rail 68 are shaped to turn towards projecting ridge 116 as shown in FIG. 6C, thereby protecting wiper 14 from damage due to longitudinal stress.

Figure 6D:
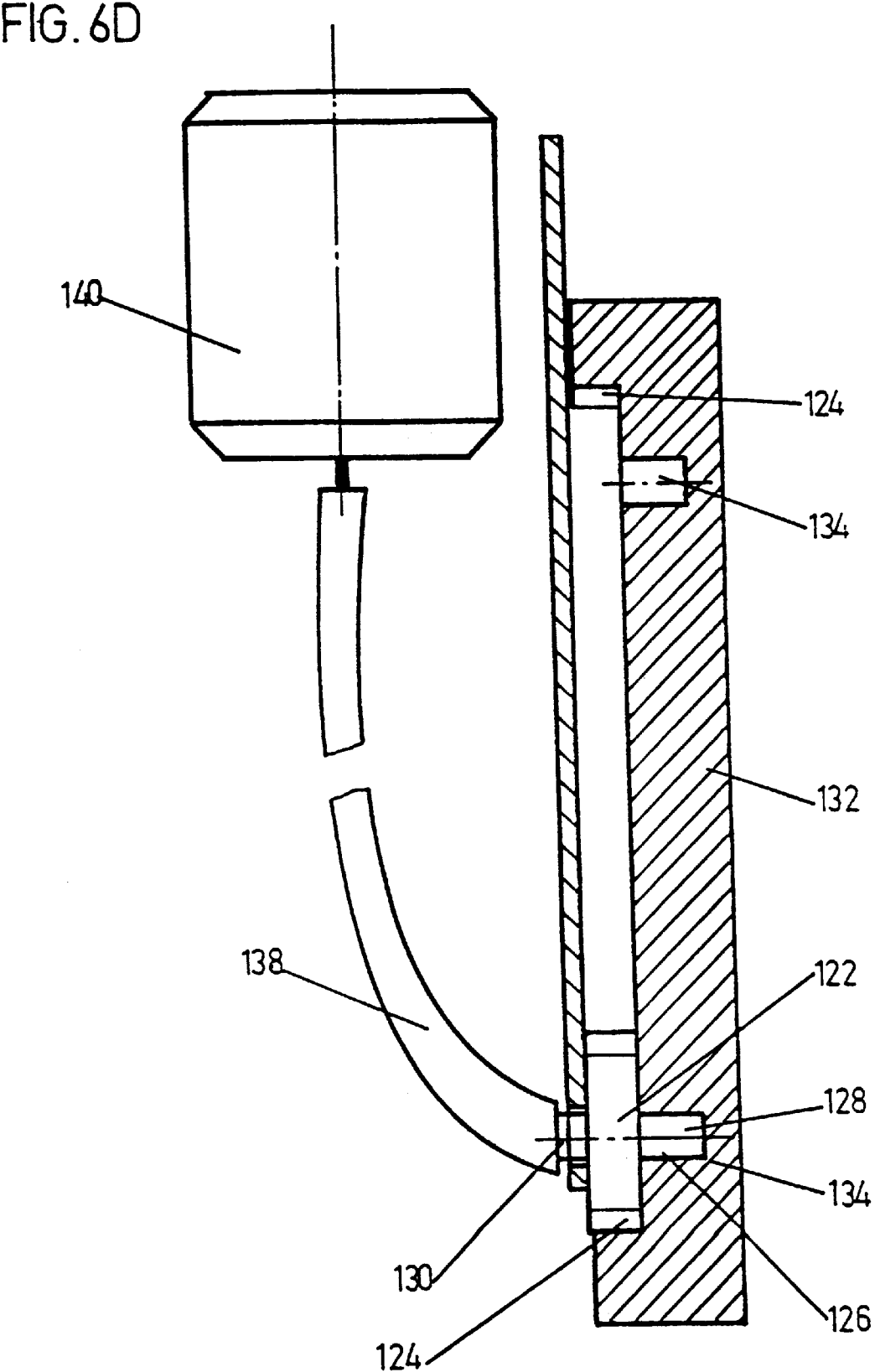
FIG. 6D is a schematic side view of the drive mechanism of the wiper of the apparatus of FIG. 6A.

Drive mechanism 112 will now be described with reference to FIGS. 6A, 6D and 6E. Drive mechanism 112 is a variation of drive mechanism 22, employing a motorized gear wheel 122 driving alone an internally geared track 124. FIG. 6D shows motorized gear wheel 122, having an axle 126 with a first end 128 extending from one side of motorized gear wheel 122 and a second end 130 extending from the other side of motorized gear wheel 122. Track 124 is formed on a base member 132 which is provided with a guide slot 134. Guide slot 134 is positioned so that, when first end 128 of axle 126 is within guide slot 134, motorized gear wheel 122 is pushed into engagement with track 124. Axle 126 traverses an elongated slot 136 in wiper 14. Second end 130 of axle 126 which extends from elongated slot 136 is coupled through a flexible drive cable 138 to a motor 140.

The use of flexible drive cable 138 allows motor 140 to be mounted remotely in a fixed position, thus enabling many types of motor 140 to be used. When motor 140 is electric, a large motor may be used without increasing the weight of the moving parts of apparatus 110. Motor 140 may be hydraulic or pneumatic, or of any other convenient type. Furthermore, motor 140 is not necessarily a dedicated power source for apparatus 110. For example, flexible drive cable 138 may be switchably connected to a rotating shaft mechanically driven by the primary engine of a vehicle.

Figure 6E:
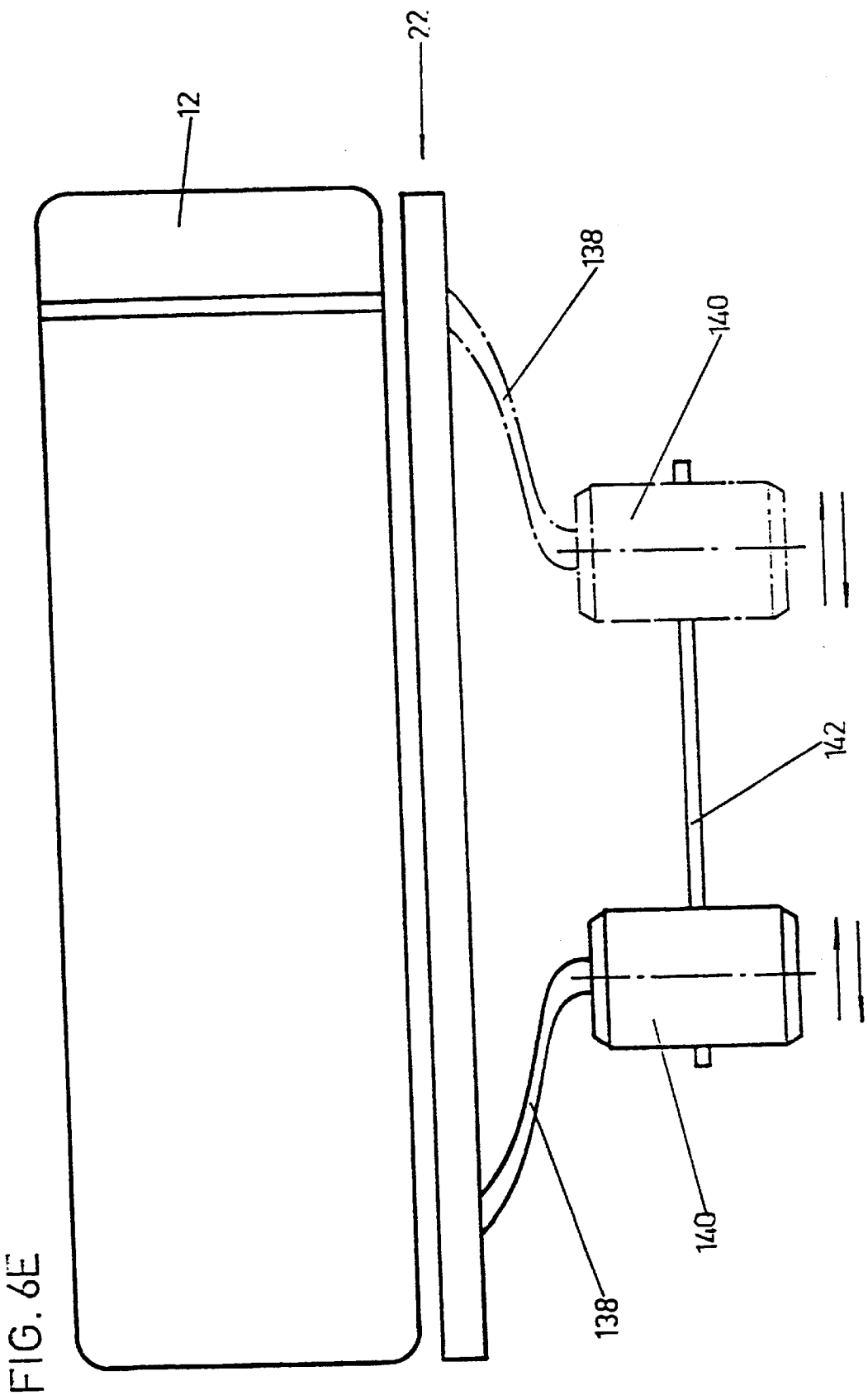
FIG. 6E is a schematic front view of the apparatus of FIG. 6A showing a motor sidably mounted on a rail.

FIG. 6E illustrates a slight variation of apparatus 110. in which motor 140 is slidably mounted on a rail 142. This configuration requires enables flexible drive cable 138 to be much shorter than the length of track 124, while providing sufficient support for a heavier motor than could be mounted on wiper 14 itself.

In operation, motor 140 rotates motorized gear wheel 122 which is thereby driven along track 124. As motorized gear wheel 122 moves, axle 126 bears against the sides of elongated slot 136, driving wiper 14 along track 124. When motorized gear wheel 122 reaches the curved parts of track 124, axle 126 is free to move alone elongated slot 136 perpendicular to the direction of motion of wiper 14. This allows motorized gear wheel 122 to travel around the entirety of track 124, thus driving wiper 14 reciprocally across window 12.

FIGS. 11–14 show an embodiment of the present invention, in which an apparatus, generally designated 220, is provided for wiping window 12. Apparatus 220 is similar to both apparatus 10 and apparatus 110, equivalent elements being designated similarly. This embodiment combines the features of a drive mechanism and a support mechanism within a compact box-like assembly 222 which has a slot 224 through which wiper base 47 extends. Box-like assembly 222, as well as the components it contains, is shaped to match the curvature of the preferred wiping path across a window, and may be curved in one or two planes accordingly. An example of the profiles of box-like assembly 222 as viewed from the top and the side is shown in FIGS. 11B and 11C, respectively.

Turning now to the structure of box-like assembly 222 in more detail, box-like assembly 222 includes a top 226, sides 228 and, optionally, a bottom 230. Top 226 features slot 224 parallel to the preferred wiping path and a guide channel 232, parallel to slot 224, in the lower surface of top 226. Slot 224 is preferably protected from entry of dirt by overlapping layers of rubber or brushes (not shown).

Figure 13A:
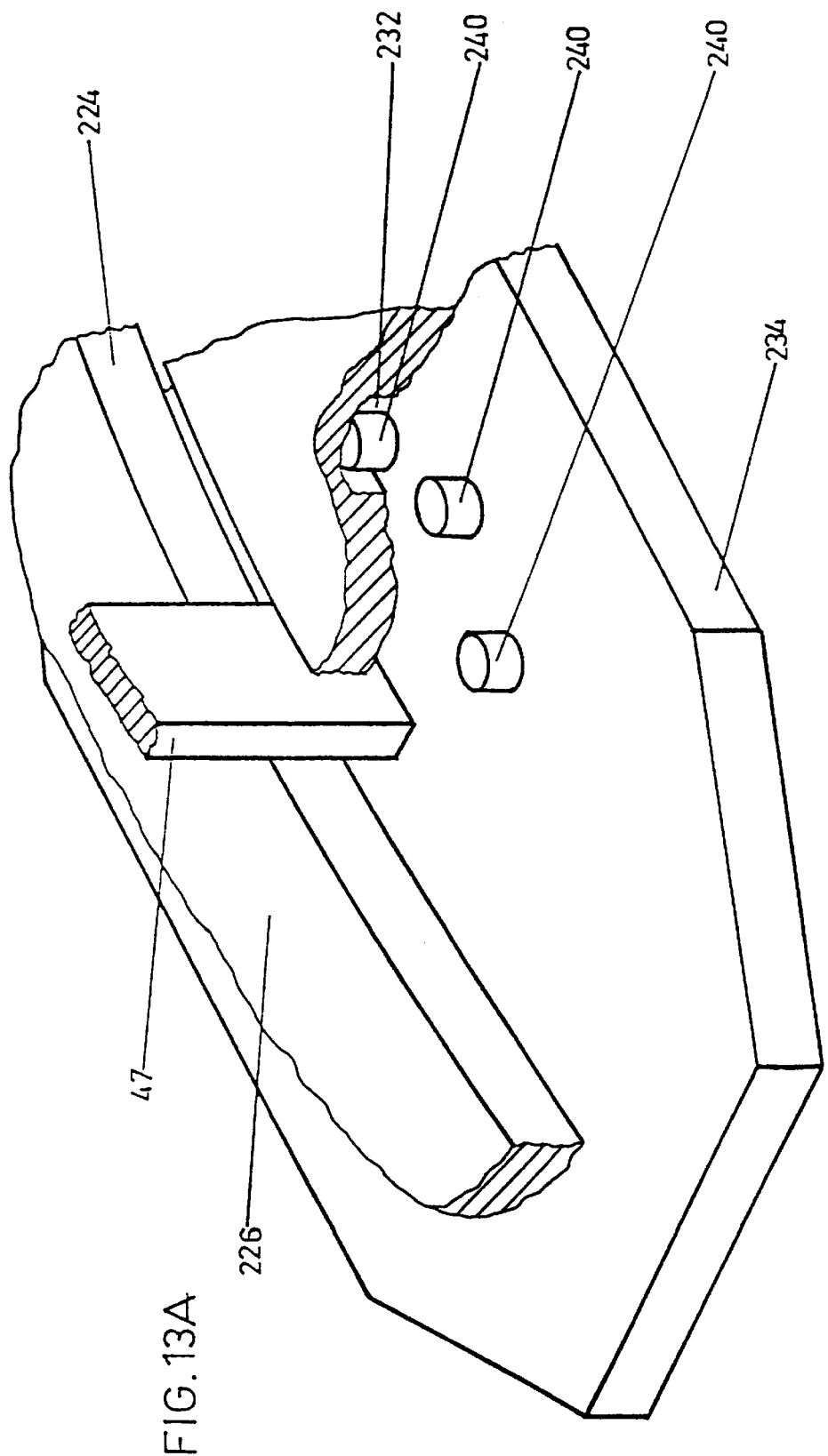
FIG. 13A is a partial cut-away view of part of the box-like assembly of FIG. 11A showing an alignment mechanism.

Apparatus 220 features a support mechanism for wiper base 47 which includes a carriage 234, attached to, or integrally formed with, wiper base 47, mounted in sliding contact with the lower surface of top 226, optionally by means of bearings (not shown). Carriage 234 is maintained in contact with top 226 by a retaining element 238 attached to wiper base 47 and sliding along the upper surface of top 226. Carriage 234 is preferably elongated parallel to slot 224 so as to stabilize the support mechanism against the angular forces generated during movement of the wiper. This elongation may require specially shaped sides 228 at the ends of box-like assembly 222 to accommodate its extension beyond other components of apparatus 220. Horizontal alignment between carriage 234 and slot 224 is maintained by three guide wheels 240 mounted on carriage 234 which engage guide channel 232. This feature is shown most clearly in FIGS. 13A and 13B. This three-contact-point design allows exact alignment of carriage 234 along a curved path parallel to the preferred wiping path. The width of guide channel 232 varies according to its curvature, as shown in FIG. 13B.

Turning now to the drive mechanism of apparatus 220, this includes a toothed drive wheel 242 driving continuously around an endless loop track 244 similar to that of FIG. 6A described above. Endless loop track 244 is attached to sides 228 and is made up of two tracks parallel to slot 224 joined by two semicircular connecting tracks. In this case, drive wheel 242 is formed as an integral part of an electric motor 246 which is attached rotatably to the support mechanism of apparatus 220. This rotatable attachment is affected by a cylindrical sleeve 248 attached to, and extending above, electric motor 246. Cylindrical sleeve 248 features an inwardly projecting ridge 250 which rotatably engages a circular plate 252 attached to carriage 234. This arrangement allows electric motor 246 and cylindrical sleeve 248 to rotate relative to carriage 234 and circular plate 252 about an axis perpendicular to, and central to, the semicircular connecting tracks. Drive wheel 242 projects through an opening 254 in cylindrical sleeve 248 such that rotation of electric motor 246 allows drive wheel 242 to travel around the semicircular connecting tracks. A locking mechanism is provided for preventing angular rotation of electric motor 246 during travel along slot 224.

Figure 14A:
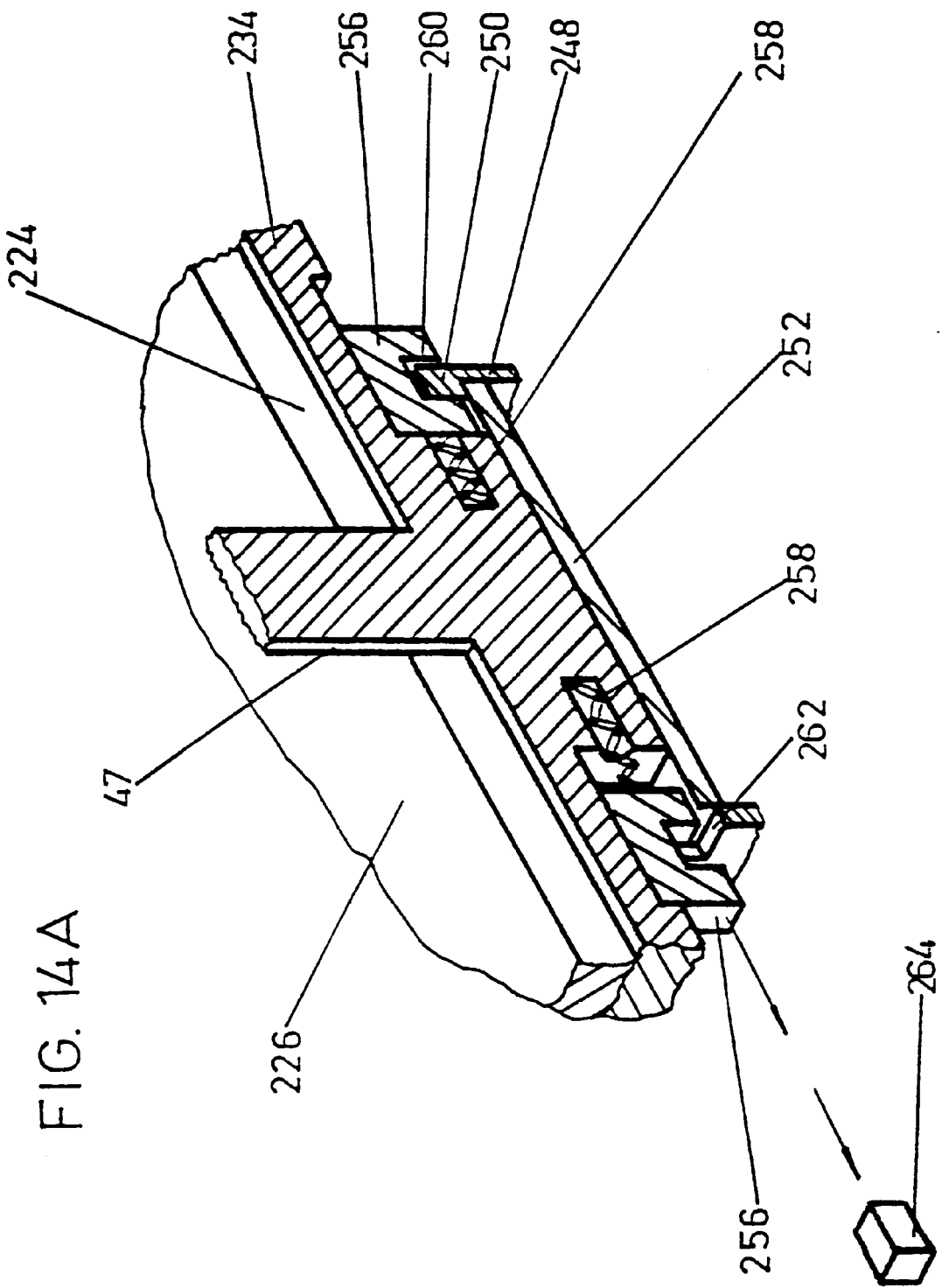
FIG. 14A is a partial cut-away perspective view of a mechanism for selectively locking angular rotation of a motor assembly for use in the box-like assembly of FIG. 11A.

The details of the mechanism for locking rotation of electric motor 246 relative to the support mechanism will now be described with reference to FIGS. 14A–14C. Carriage 234 is provided with two slidable catch members 256 aligned with the direction of slot 224. Each catch member 256 is slidable between a first position proximal to wiper base 47 and a second position distal therefrom. A spring 258 biases each catch member towards the distal position. Catch members 256 each feature a recess 260 for receiving inwardly projecting ridge 250 when in their proximal position. A gap 262 is provided in inwardly projecting ridge 250 such that, when gap 262 is aligned with one of catch members 256, spring 258 forces catch member 256 outwards to its distal position thereby locking cylindrical sleeve 248 against angular rotation. Cylindrical sleeve 248 remains locked until carriage 234 reaches the end of slot 224 at which point catch member 256 strikes an end pin 264 which forces catch member 256 into its proximal position. Cylindrical sleeve 248, and hence electric motor 246, are then free to rotate through 180° as drive wheel 242 travels around the semicircular connecting track until gap 262 is aligned with the second catch member 256. This second catch member 256 is then forced outwards to its distal position again locking cylindrical sleeve 248 while carriage 234 travels in the opposite direction.

It is preferable to provide a retaining mechanism in order to prevent movement of carriage 234 parallel to slot 224 while drive wheel 242 is travelling around the semicircular connecting tracks, thereby maintaining engagement between drive wheel 242 and track 244. This mechanism may be a simple mechanical catch or an electromagnetic system. In a simple case, small permanent magnets may be positioned to temporarily maintain carriage 234 in its end positions.

Optionally, electric motor 246 is additionally supported from bottom 230 by a bracket 266 which is rotatable within, and slidable along, a channel parallel to slot 224. An electrical supply to electric motor 246 may be connected through self-folding cables (not shown) attached to electric motor 246 through sliding contacts, or by sliding contacts parallel to loop track 244.

It will be readily appreciated that this embodiment of the present invention provides a very compact and low maintenance implementation of the present invention. Box-like assembly 222 provides valuable protection for all moving parts of the apparatus from moisture and dirt. Box-like assembly 222 itself may be constructed from modular components. For example, sides 228 and their attached tracks may be formed as standard components which are flexed to the curvature of a given windscreen at the time of installation. Only top 226, which provides the overall wiping profile through the forms of slot 224 and guide channel 232, needs to be manufactured specifically for the shape of the windscreen or other surface to be wiped.

It will also be appreciated that the arrangement of the components or apparatus 220 may be varied according to considerations of the stresses expected to be imposed on the system. For example, it may be advantageous in certain cases to locate the drive mechanism closest to the wiper and to provide the support mechanism nearer the bottom of box-like assembly 222. In this case, the locking mechanism for preventing rotation of electric motor 246 while it travels along slot 224 may be replaced by a simple alignment pin attached to electric motor 246 which slides within an endless groove which is parallel to loop track 244. A further advantage of reversal of the positions of the drive mechanism and the support mechanism is the possibility of mounting drive wheel 242 in a recessed track 268 as shown in FIG. 15. The position of recessed track 268 provides excellent protection against penetration of dirt thereto.

Additionally, although electric motor 246 has been illustrated mounted on the axis of rotation, it may alternatively be mounted off-axis.

Although the embodiments so far described employ a single drive wheel travelling along a closed track, it should be appreciated that other embodiments having a mechanism for driving alternately along a first and a second track also fall within the scope of the present invention. One example will now be described with reference to FIG. 7.

Figure 7:
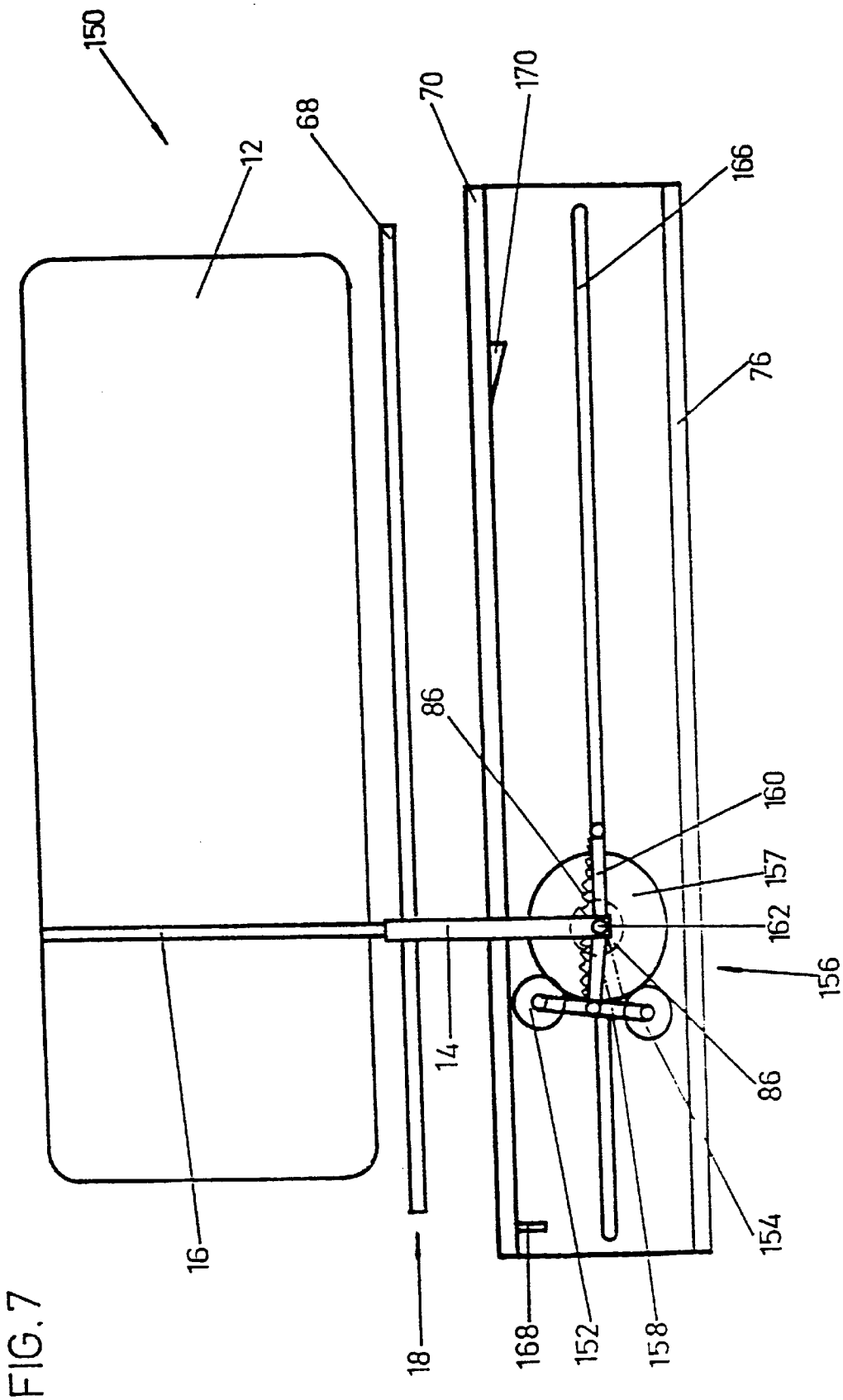
FIG. 7 is a schematic front view of a third embodiment of an apparatus for wiping a window, the apparatus being constructed and operative according to the teachings of the present invention.

FIG. 7 shows a third embodiment of the present invention, in which an apparatus, generally designated 150, is provided for wiping window 12. Apparatus 150 is similar to apparatus 10, equivalent elements being designated similarly. This embodiment has a first motorized drive wheel 152 for driving wiper 14 along upper track 70 in first direction 60 and a second motorized drive wheel 154 for driving wiper 14 along lower track 76 in second direction 62. Motorized drive wheels 152 and 154 are mounted on a spring-biased rocker mechanism 156 and are both driven through a transmission wheel 157 by electric motor 86 (indicated by a dashed-line for clarity). Spring-biased rocker mechanism 156 includes a rocker 158 supporting motorized drive wheels 152 and 154, and a bracket 160. Rocker 158 and bracket 160 are connected by a pivot-joint 162. A spring 164 stretched between rocker 158 and bracket 160 tends to tip rocker 158 either to a first position in which first motorized drive wheel 152 is against track 70 or to a second position in which second motorized drive wheel 154 is against track 76. The combined assembly of electric motor 86 with spring-biased rocker mechanism 156 is slidable along a slot 166 parallel to tracks 70 and 76. Triggers 168 and 170 are provided near the ends of track 70 for tipping spring-biased rocker mechanism 156 between its first and second positions.

When apparatus 150 is activated with spring-biased rocker mechanism 156 in its first position, electric motor 86 rotates transmission wheel 157, turning motorized drive wheels 152 and 154. First motorized drive wheel 152, which is drivingly engaged with upper track 70, then drives wiper 14 across window 12. When first motorized drive wheel 152 strikes trigger 168, spring-biased rocker mechanism 156 is tipped to its second position in which first motorized drive wheel 152 is disengaged from upper track 70 and second motorized drive wheel 154 drivingly engages lower track 76. Wiper 14 is then driven back across window 12 until first motorized drive wheel 152 strikes trigger 170 returning spring-biased rocker mechanism 156 to its first position.

This embodiment is most simply implemented when motorized drive wheels cooperate with tracks 70 and 76 through friction. If geared wheels are used, a simple clutch mechanism is required to allow meshing of the teeth when spring-biased rocker mechanism 156 is tipped.

In a variation of this embodiment, the functions of both motorized drive wheel 152 and motorized drive wheel 154 are performed by a single motorized drive wheel. In this case, tracks 70 and 76 are positioned close together, typically between 10–30 mm. Spring-biased rocker mechanism 156 then transfers the single motorized drive wheel directly between upper track 70 and lower track 76.

Triggers 168 and 170 are preferably moveable along tracks 70 and 76. This allows for different modes of operation in which wiper 14 wipes either the whole of window 12 or a part thereof, for example the area directly in front of the driver only. Moving one of triggers 168 and 170 may also enable wiper 14 to be moved to an extreme position at or beyond the edge of window 12 for parking.

Figure 8B:
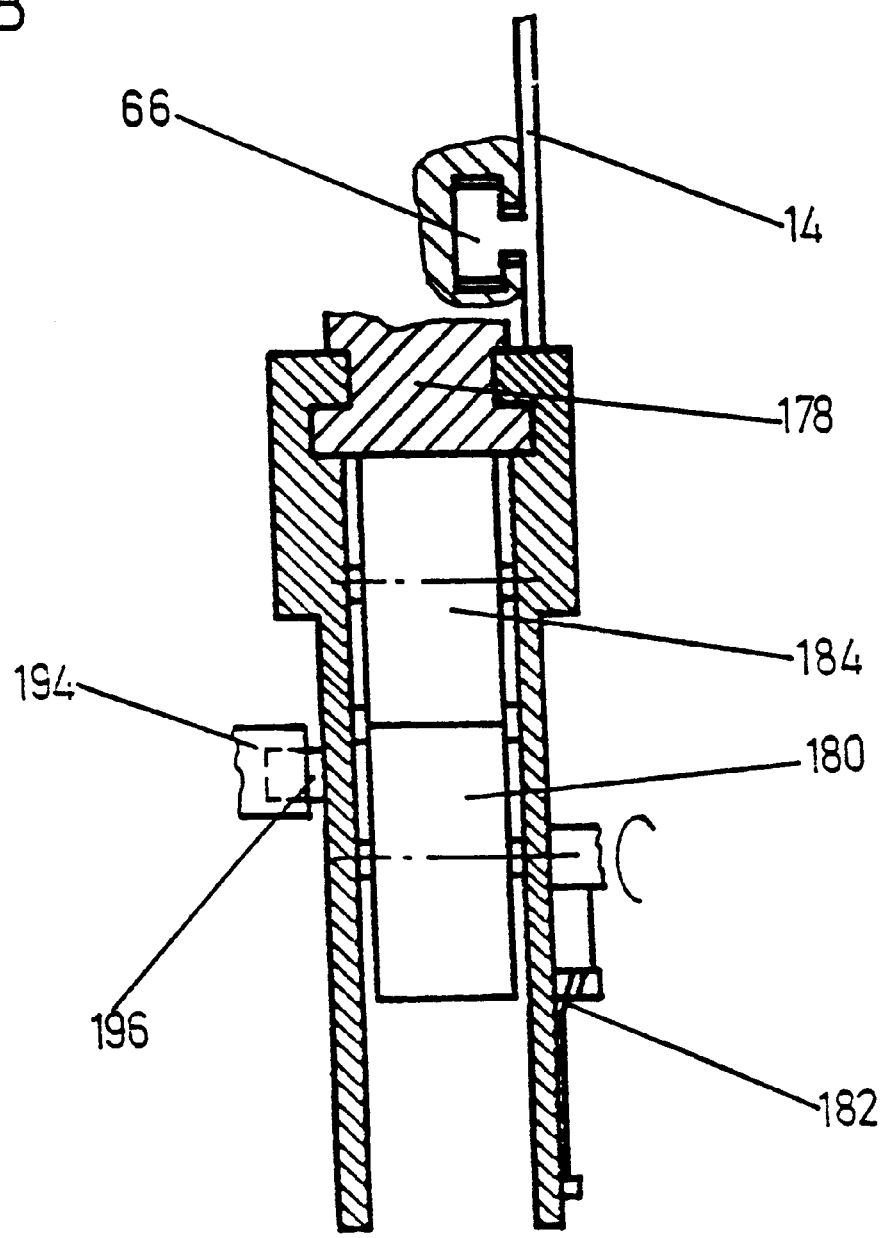
FIG. 8B is a schematic side view of the drive mechanism of the wiper of the apparatus of FIG. 8A.

Referring now to FIGS. 8A and 8B, a fourth embodiment of the present invention using a single track will be described. This embodiment overcomes the problems of repeatedly reversing the direction of the loaded motor described above in relation to the prior art. This is done by using a motorized drive wheel powered by a motor which rotates unidirectionally.

FIGS. 8A and 8B show an apparatus, generally designated 172 for wiping window 12. Apparatus 172 is generally similar to apparatus 10, equivalent elements being designated similarly. Apparatus 172 has a drive mechanism 174 including a drive-wheel assembly 176 which drives wiper 14 reciprocally along a single track 178. Drive-wheel assembly 176 includes a transmission wheel 180 urged by a spring-lever 182 to engage with a motorized drive wheel 184. A reversal wheel 186 is displaceable between a first position 188 and a second position 190. Reversal wheel 186 tends to remain in its current position unless forced through a narrow slot 189. When reversal wheel 186 is in first position 188, it is engaged between motorized drive wheel 184 and transmission wheel 180, forcing transmission wheel 180 against spring-lever 182 away from motorized drive wheel 184. When reversal wheel 186 is in second position 190, it is disengaged from motorized drive wheel 184 and transmission wheel 180, leaving them engaged under the influence of spring-lever 182. Reversal wheel 186 is moved between first position 188 and second position 190 by triggers 192 and 194 positioned near the ends of track 178 so as to collide with a projection 196 from the axle of reversal wheel 186.

In operation, when drive mechanism 174 is activated with reversal wheel 186 in second position 190, motorized drive wheel 184 is turned by direct contact with transmission wheel 180, driving drive-wheel assembly 176 along track 178 in first direction 60. When driving drive-wheel assembly 176 nears the end of track 178, projection 196 strikes trigger 194 forcing reversal wheel 186 into first position 188. In this position, motorized drive wheel 184 is driven by transmission wheel 180 through transmission wheel 180, thereby reversing the direction of rotation of motorized drive wheel 184. Drive-wheel assembly 176 is then driven along track 178 in second direction 62 until it nears the other end of track 178. Projection 196 then strikes trigger 192 forcing reversal wheel 186 back to second position 190. Thus wiper 14 is driven reciprocally across window 12.

This embodiment is most simply implemented when motorized drive wheels are driven through a friction drive. If geared wheels are used, a simple clutch mechanism is required-to allow meshing of the teeth of reversal wheel 186.

Figure 9A:
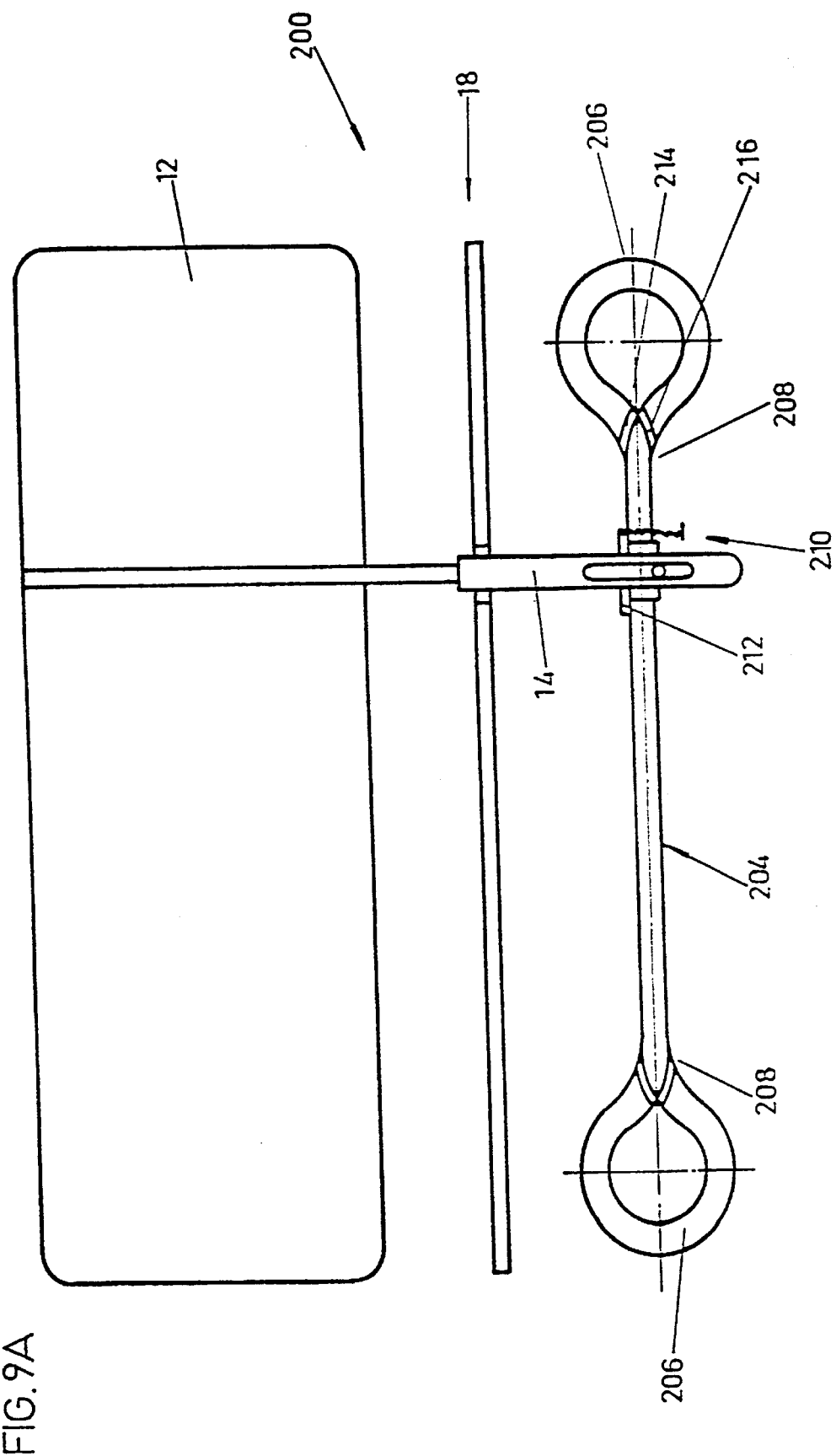
FIG. 9A is a schematic front view of a fifth embodiment of an apparatus for wiping a window, the apparatus being constructed and operative according to the teachings of the present invention.
Figure 9B:
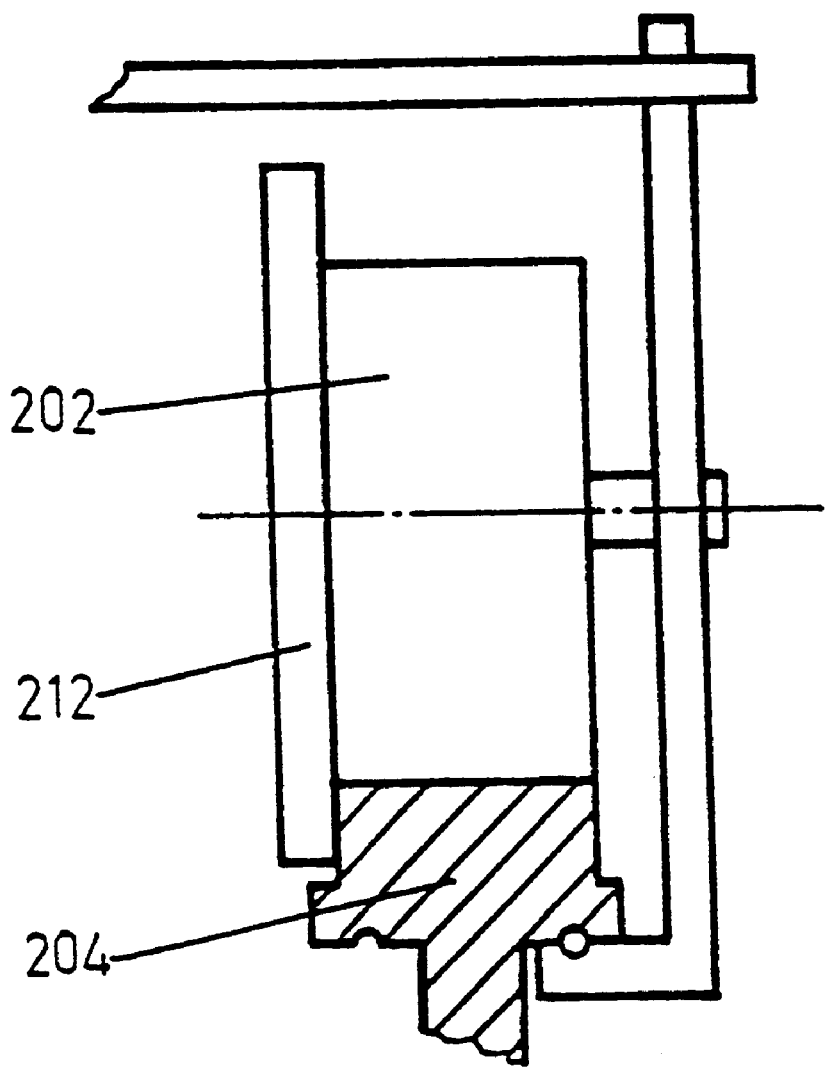
FIG. 9B is a schematic side view of the drive mechanism of the wiper of the apparatus of FIG. 9A.

Referring now to FIGS. 9A and 9B, a fifth embodiment of the present invention using a single track will be described. There is shown an apparatus, generally designated 200 for wiping window 12. Apparatus 200 is generally similar to apparatus 10, equivalent elements being designated similarly. Apparatus 200 also uses a single drive wheel 202 travelling along a single track 204. In this embodiment, the direction reversal is achieved by reversal loops 206 attached to the ends 208 of track 204. Drive wheel 202 is provided with a turning mechanism, represented by spring 210, causing it to tend to turn to the right in whatever direction it is travelling. A flange edge 212 keeps drive wheel 202 on track 204. Ends 208 are provided with a first groove 214 to allow flange edge 212 to cross to the inside of loop 206, and a second groove 216 to allow flange edge 212 to leave loop 206 in the reverse direction.

In operation, drive wheel 202 is rotated by a motor through a flexible, drive cable so that it drives wiper 14 along track 204 in first direction 60. On reaching end 208, drive wheel 202 travels around the inside of reversal loop 206, returning to track 204 in second direction 62. Thus wiper 14 is driven reciprocally across window 12.

Figure 10A:
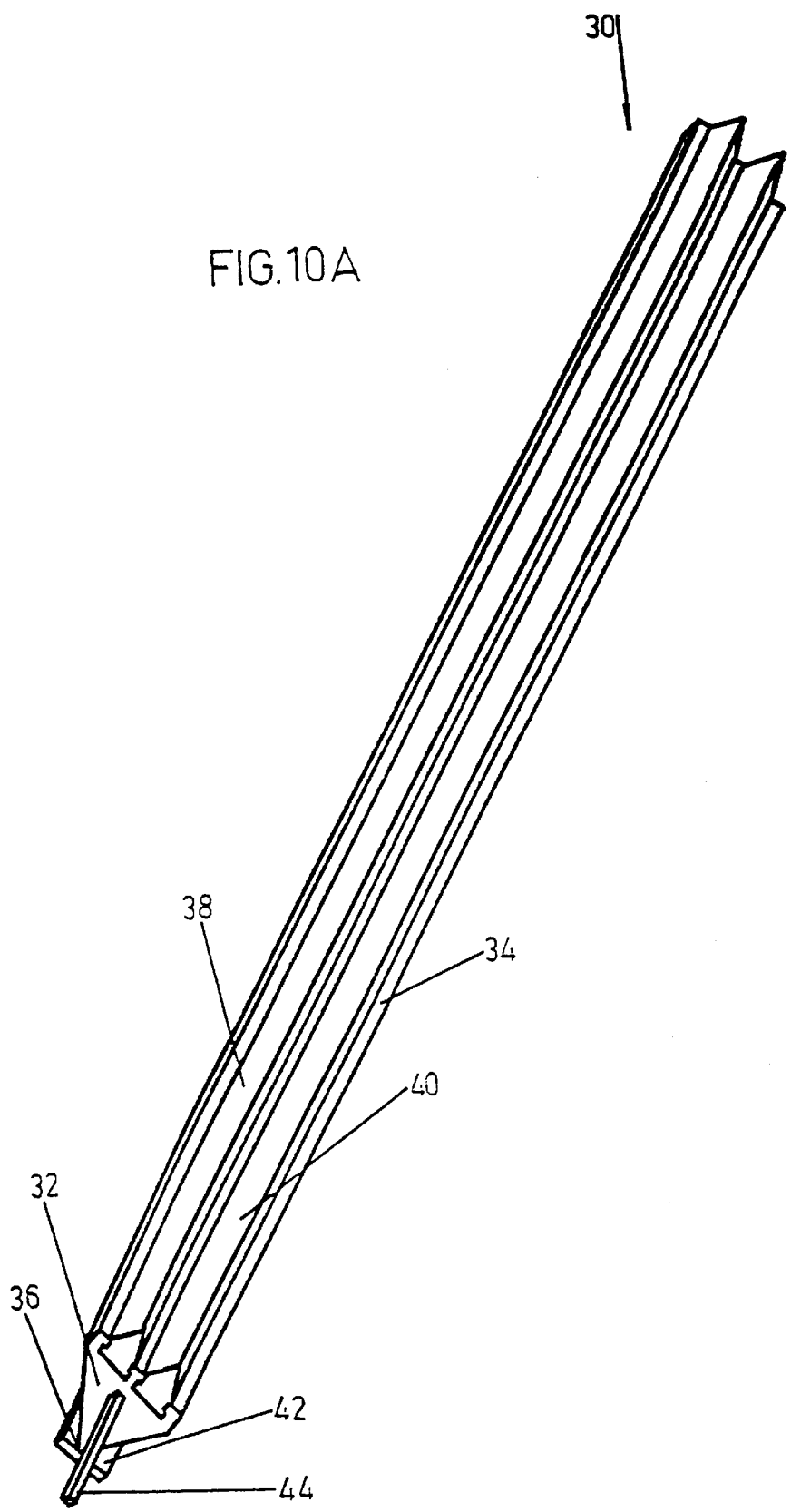
FIG. 10A is a schematic view of a blade assembly for use as part of a wiper constructed and operative according to the teachings of the present invention.
Figure 10B:
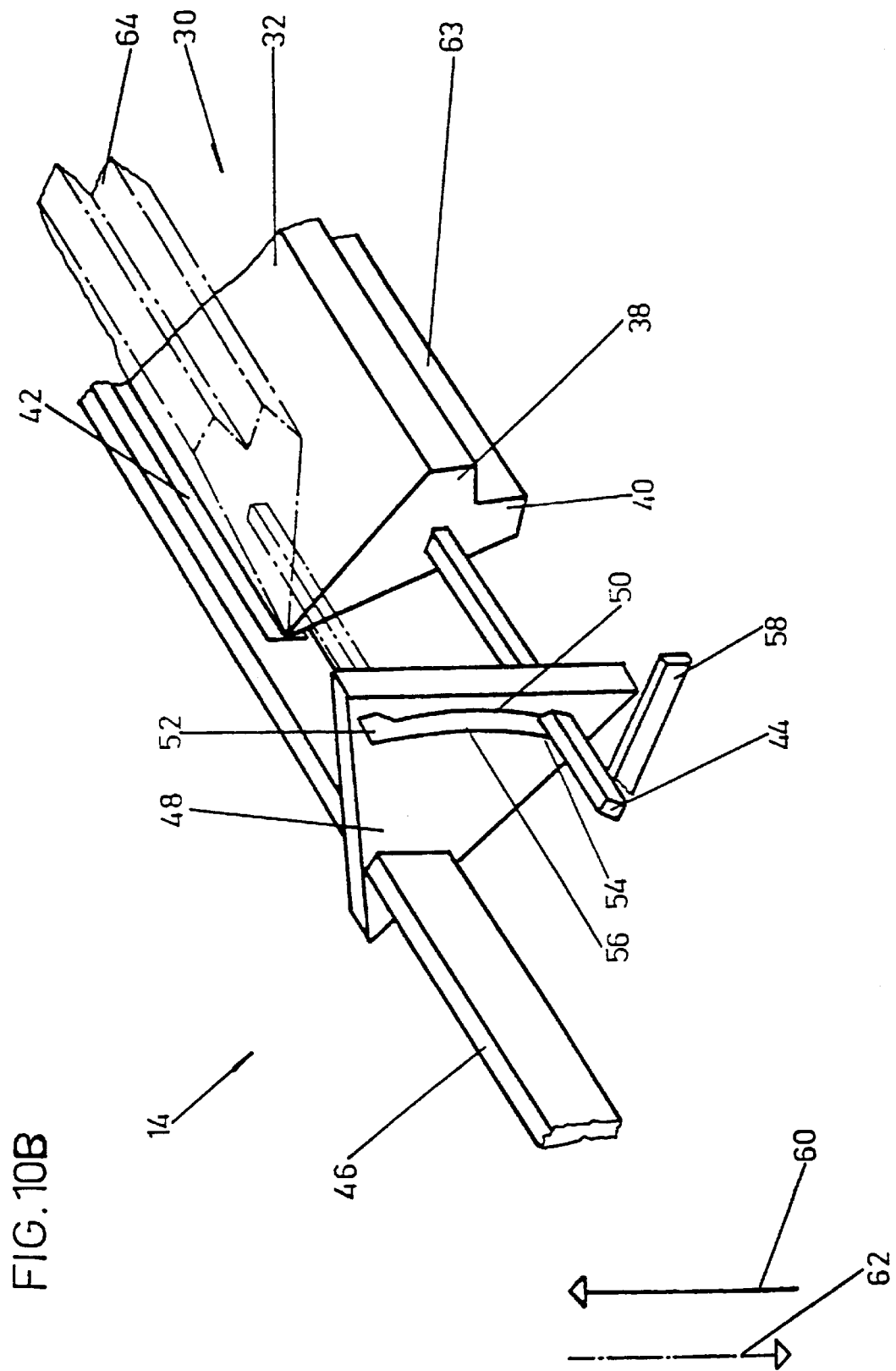
FIG. 10B is a schematic view of part of a wiper including the blade assembly of FIG. 10A.

Referring now to FIGS. 10A, 10B and 10C, a preferred form of wiper 14 will be described. Wiper 14, which may be used with any of the above embodiments or to replace the wiper of a conventional system, is designed to reduce "drag-back" of water across window 12. The effect herein referred to as "drag-back" is the common problem that some of the water swept by a wiper during one stroke is pulled back on to window 12 as the wiper starts the next stroke. "Drag-back" results from the fact that the wiper ends each stroke with its blade in contact with some of the water swept during that stroke. When the blade starts its movement in the opposite direction, surface tension tends to drag some of this water back across the window.

FIG. 10A shows a blade assembly, generally designated 30, for use in a preferred design of wiper 14 for reducing drag-back of water. Blade assembly 30 has a long, generally triangular body 32 with a front face 34 and a back edge 36. Front face 34 is adapted to receive a first blade 38 and a second blade 40, both substantially parallel to the length of body 32. Back edge 36 is attached to a hinge 42 along part of the length of body 32. A rod 44 extends from body 32 substantially parallel to its length. Rod 44 intersects a line from the center of front face 34 to back edge 36.

FIG. 10B shows wiper 14 including blade assembly 30. Body 32 is attached to a wiper arm 46 by hinge 42. A bracket 48 is attached to wiper arm 46, bracket 48 having a slot 50 for receiving rod 44. Slot 50 has a first aperture 52 and a second aperture 54 connected by a narrow arcuate channel 56 such that rod 44 tends to remain in either first aperture 52 or second aperture 54 unless forced through channel 56. A trip bar 58 is provided near each end of the path travelled by wiper 14. Each time wiper 14 passes trip bar 58, rod 44 collides with trip bar 58 so as to force rod 44 through channel 56. Rod 44 and trip bar 58 are designed with sufficiently flexible to allow rod 44 to pass as wiper 14 continues its movement.

As a result of this structure, wiper 14 assumes one of two states, defined by the position of rod 44. When rod 44 is in second aperture 54, wiper 14 is in a first state 63, as shown. When rod 44 is in first aperture 52, wiper 14 is in a second state 64 (represented by dashed lines). Wiper 14 moves between first state 63 and second state 64 as a result of passing trip bar 58. Motion of wiper 14 in a first direction 60 past trip bar 58 tends to force rod 44 to second aperture 54, thereby creating or maintaining first state 63. Motion of wiper 14 in a second direction 62 (opposite to first direction 60) past trip bar 58, tends to force rod 44 through channel 56 to first aperture 52, thereby creating or maintaining second state 64.

Referring now additionally to FIG. 10C, the operation of wiper 14 will be described. Wiper 14 is shown in first state 63, at the beginning of its movement in a first direction 60 across window 12 of a vehicle 61. In first state 63, only first blade 38 is in contact with window 12. As wiper 14 nears the end of its motion in first direction 60, it passes trip bar 58, in this case maintaining its current state. When wiper 14 starts to move in second direction 62, it again passes trip bar 58, this time forcing wiper 14 into second state 64 in which only second blade 40 is in contact with window 12. Second blade 40 then wipes window 12 as wiper 14 continues in second direction 62. Any water adhering to first blade 38 from its movement in first direction 60 drains down first blade 38 without contacting window 12, thus preventing "drag-back". It should be noted that an equivalent wiper design may be used as part of a conventional wiper system attaching to a conventional wiper mounting.

It will be appreciated that the above descriptions are intended only to serve as examples, and that many other embodiments are possible within the spirit and the scope of the present invention.

What is claimed is:

1. An apparatus for wiping a non-planar surface, the apparatus comprising:
   (a) a track arrangement including at least one track, said at least one track being taken to define a length of said track arrangement;
   (b) a drive wheel assembly including at least one motorized drive wheel, said drive wheel assembly engaging said track arrangement, and driving in alternate directions along the length of said track arrangement;
   (c) a wiper mechanically coupled to said drive wheel assembly such that movement of said drive wheel assembly along the length of said track arrangement draws said wiper across the surface; and
   (d) a motor operatively coupled to said drive wheel assembly for driving said at least one motorized drive wheel, wherein the length of said track defines a non-linear path parallel to a desired non-linear wiping path, and wherein said drive wheel assembly is configured such that continuous rotation of said motor in one direction generates alternating movement of said drive wheel assembly along said track arrangement so as to generate reciprocation of said wiper along said desired non-linear wiping path.

2. The apparatus of claim 1, wherein said at least one track is implemented as a first track and a second track deployed in substantially parallel, spaced relation.

3. The apparatus of claim 2, wherein said first track is curved such that a first plane containing both a line of shortest distance between a first point on said first track and said second track and a line tangential to said first track at said first point is non-parallel to a second plane containing both a line of shortest distance between a second point on said first track and said second track and a line tangential to said first track at said second point.

4. The apparatus of claim 2, wherein said first track is curved such that a line of shortest distance between a first point on said first track and said second track is non-parallel to a line of shortest distance between a second point on said first track and said second track.

5. The apparatus of claim 2, wherein said drive wheel assembly drives alternately along said first track in a first direction and along said second track in a second direction opposite to said first direction.

6. The apparatus of claim 2, wherein said track arrangement further includes:
   (a) a first curved connecting track connecting between a first end of said first track and a first end of said second track; and
   (b) a second curved connecting track connecting between a second end of said first track and a second end of said second track, such that said first track, said second track, said first connecting track and said second connecting track form a closed loop track.

7. The apparatus of claim 6, wherein said motorized drive wheel drives along an inner surface of said closed loop track.

8. The apparatus of claim 6, wherein said motor is operatively coupled to said drive wheel assembly for driving said at least one motorized drive wheel along said closed loop track.

9. The apparatus of claim 8, wherein said motor is mounted so as to be slidable along a path substantially parallel to said first track.

10. The apparatus of claim 9, wherein said motor is additionally mounted so as to rotatable about an axis.

11. The apparatus of claim 10, further comprising a locking mechanism for selectively locking rotation of said motor when said motorized drive wheel is driving along said first track or said second track.

12. The apparatus of claim 6, wherein said track arrangement includes a casing substantially enclosing said closed loop track, said casing having a non-linear slot running substantially parallel to said first track.

13. The apparatus of claim 6, wherein said single motorized drive wheel has a first surface with teeth for driving along said first track and a second surface with teeth for driving along said first curved connecting track.

14. The apparatus of claim 6, wherein said first track has a first removable section and said second track has a second removable section, the apparatus further comprising an additional curved connecting track, said additional curved connecting track being substitutable for said first removable section and said second removable section so as to form a shortened closed loop track.

15. The apparatus of claim 2, wherein said drive wheel assembly includes a spring-biased mechanism assuming a first position in which said drive wheel assembly enrages said first track and a second position in which said drive wheel assemble engages said second track.

16. The apparatus of claim 2, wherein said at least one motorized drive wheel is implemented as a first and a second motorized drive wheel, said drive wheel assembly further including a mechanism for alternately driving said first motorized drive wheel alone said first track and said second motorized drive wheel along said second track.

17. The apparatus of claim 2, wherein said at least one motorized drive wheel is implemented as a single motorized drive wheel said drive wheel assembly further including a mechanism for transferring said single motorized drive wheel between said first track and said second track.

18. The apparatus of claim 1, wherein said motor is mounted so as to be slidable along a path substantially parallel to said at least one track.

19. The apparatus of claim 1, wherein said drive wheel assembly includes a mechanism for reversing the direction of rotation of said at least one motorized drive wheel.

20. The apparatus of claim 1, wherein said motor is operatively coupled through a flexible drive cable to said drive wheel assembly for driving said at least one motorized drive wheel.

21. The apparatus of claim 1, wherein said at least one track has a non-uniform curvature.

22. The apparatus of claim 1, wherein said at least one track has non-coplanar curvature.

23. The apparatus of claim 1, wherein said track arrangement includes a casino substantially enclosing said at least one track, said casing having a non-linear slot running substantially parallel to said at least one track.

24. The apparatus of claim 1, wherein said wiper has a length, said length forming a first angle with the wiping path when said wiper is at a first end of the wiping path, said length forming a second angle with the wiping path different from said first angle when said wiper is at a second end of the wiping path.

25. The apparatus of claim 1, further comprising a support mechanism for supporting said wiper such that it can move exclusively along the preferred wiping path.

26. An apparatus for wiping a non-planar surface, the apparatus comprising:
 (a) a track arrangement including a first track and a second track deployed in substantially parallel, spaced relation, said first track being taken to define a length of said track arrangement;
 (b) a drive wheel assembly including at least one motorized drive wheel, said drive wheel assembly alternately engaging said first and said second tracks, and driving in alternate directions along the length of said track arrangement; and
 (c) a wiper mechanically coupled to said drive wheel assembly such that movement of said drive wheel assembly along the length of said track arrangement draws said wiper across the surface, wherein the length of said track arrangement defines a non-linear path parallel to a desired non-linear wiping path such that said wiper reciprocates along said desired non-linear wiping path.

\* \* \* \* \*